US009857807B2

(12) United States Patent
Baca et al.

(10) Patent No.: US 9,857,807 B2
(45) **Date of Patent: *Jan. 2, 2018**

(54) AUTOMATED RELIEF VALVE CONTROL SYSTEM AND METHOD

(71) Applicant: S.P.M. FLOW CONTROL, INC., Forth Worth, TX (US)

(72) Inventors: Matthew S. Baca, Forth Worth, TX (US); Brian C. Witkowski, Weatherford, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,438

(22) Filed: Jan. 25, 2016

(65) Prior Publication Data

US 2016/0161956 A1 Jun. 9, 2016

Related U.S. Application Data

(63) Continuation of application No. 13/964,863, filed on Aug. 12, 2013, now Pat. No. 9,273,543, which is a (Continued)

(51) Int. Cl.
*E21B 34/16* (2006.01)
*E21B 21/08* (2006.01)
(Continued)

(52) U.S. Cl.
CPC ....... *G05D 16/2013* (2013.01); *E21B 33/068* (2013.01); *E21B 34/02* (2013.01);
(Continued)

(58) Field of Classification Search
CPC ........... E21B 21/08; E21B 21/10; E21B 34/16
See application file for complete search history.

(56) References Cited

U.S. PATENT DOCUMENTS

| | | | |
|---|---|---|---|
| 345,420 | A | 7/1886 | Eskholme et al. |
| 375,464 | A | 12/1887 | Thacher et al. |

(Continued)

FOREIGN PATENT DOCUMENTS

| | | | |
|---|---|---|---|
| AU | 1320088 | A | 9/1988 |
| AU | 1320088 | A | 9/1988 |

(Continued)

OTHER PUBLICATIONS

"Advisory Action dated May 20, 2013, by the USPTO, re U.S. Appl. No. 12/165,680".

(Continued)

*Primary Examiner* — Catherine Loikith
(74) *Attorney, Agent, or Firm* — Haynes and Boone, LLP

(57) ABSTRACT

A pressure relief valve system for use in a downhole operation may include a pressure relief valve configured to relieve pressure from high pressure tubing extending between a pump and a wellhead, and may include a sensor operably disposed to detect pressure in the high pressure tubing. The pressure relief valve system also may include a controller having a pressure threshold stored therein. The controller may be configured to receive data from the sensor and compare the detected pressure to the stored pressure threshold. A valve actuation system may be in communication with the pressure relief valve and in communication with the controller. The valve actuation system may be configured to change the state of the pressure relief valve from a closed state to an open state in response to a command signal from the controller.

21 Claims, 15 Drawing Sheets

Related U.S. Application Data continuation-in-part of application No. 13/886,771, filed on May 3, 2013, now Pat. No. 9,322,243.

(60) Provisional application No. 61/684,394, filed on Aug. 17, 2012.

(51) Int. Cl.

| | |
|---|---|
| ***E21B 21/10*** | (2006.01) |
| ***G05D 16/20*** | (2006.01) |
| ***E21B 43/26*** | (2006.01) |
| ***E21B 33/068*** | (2006.01) |
| ***E21B 34/02*** | (2006.01) |
| ***F15B 20/00*** | (2006.01) |

(52) U.S. Cl.

CPC .............. *E21B 43/26* (2013.01); *F15B 20/00* (2013.01); *F15B 2211/50536* (2013.01); *F15B 2211/50554* (2013.01)

(56) References Cited

U.S. PATENT DOCUMENTS

| | | | |
|---|---|---|---|
| 580,226 | A | 4/1897 | Sanford |
| 741,477 | A | 10/1903 | Flinn |
| 1,201,022 | A | 10/1916 | Conniff |
| 1,379,092 | A | 5/1921 | Fraccascia et al. |
| 1,452,603 | A | 4/1923 | Himes |
| 1,473,634 | A | 11/1923 | Loudon |
| 1,483,001 | A | 2/1924 | Kurre |
| 1,488,211 | A | 3/1924 | Loeffler |
| 1,543,637 | A | 6/1925 | Woll |
| 1,607,463 | A | 11/1926 | Kent |
| 1,664,493 | A | 4/1928 | Smith |
| 1,675,808 | A | 7/1928 | Kliss |
| 1,764,936 | A | 6/1930 | Dean |
| 1,798,498 | A | 3/1931 | Riley |
| D86,952 | S | 5/1932 | Garrison |
| 1,889,256 | A | 11/1932 | Lipscomb et al. |
| 1,990,090 | A | 2/1935 | Packard |
| 2,197,320 | A | 4/1940 | Shenton |
| 2,310,583 | A | 2/1943 | Johnson |
| 2,310,813 | A | 2/1943 | Sellmeyer |
| 2,339,287 | A | 1/1944 | Neef, Jr. |
| 2,354,161 | A | 7/1944 | Waterman |
| 2,361,881 | A | 10/1944 | Sheppard |
| 2,391,266 | A | 12/1945 | Parker |
| 2,404,142 | A | 7/1946 | Parker |
| D150,466 | S | 8/1948 | Schuler |
| 2,506,162 | A | 5/1950 | Metzgar |
| 2,576,431 | A | 11/1951 | White |
| 2,587,212 | A | 2/1952 | Placette |
| 2,589,144 | A | 3/1952 | Russell et al. |
| 2,606,068 | A | 8/1952 | Bonacor |
| 2,612,340 | A | 9/1952 | Laurent |
| 2,663,458 | A | 12/1953 | MacGlashan, Jr. |
| 2,694,503 | A | 11/1954 | Young et al. |
| 2,717,001 | A | 9/1955 | Perrault |
| 2,746,773 | A | 5/1956 | Bily |
| 2,766,999 | A | 10/1956 | Watts et al. |
| 2,795,459 | A | 6/1957 | Cornelius |
| 2,923,317 | A | 2/1960 | McInerney |
| 2,925,827 | A | 2/1960 | Anderson et al. |
| 2,969,492 | A | 1/1961 | Wheatley |
| 3,024,047 | A | 3/1962 | Schmohl |
| 3,060,961 | A | 10/1962 | Conley |
| 3,061,267 | A | 10/1962 | Hamer |
| 3,064,940 | A | 11/1962 | Anderson et al. |
| 3,072,379 | A | 1/1963 | Hamer |
| 3,108,939 | A | 10/1963 | Sabins |
| 3,113,792 | A | 12/1963 | Brown |
| 3,150,681 | A | 9/1964 | Hansen et al. |
| 3,160,426 | A | 12/1964 | Faeser |
| 3,194,589 | A | 7/1965 | Kahlbau et al. |
| 3,204,484 | A | 9/1965 | Gustafson et al. |
| 3,216,746 | A | 11/1965 | Watts |
| 3,228,334 | A | 1/1966 | Oss |
| 3,238,687 | A | 3/1966 | Tisbo |
| 3,241,567 | A | 3/1966 | Pusch |
| 3,294,425 | A | 12/1966 | Franck |
| 3,341,232 | A | 9/1967 | Deakins |
| 3,343,802 | A | 9/1967 | Schuilwerve |
| 3,346,002 | A | 10/1967 | Thompson Jr. et al. |
| 3,357,679 | A | 12/1967 | Gulick |
| 3,403,931 | A | 10/1968 | Crain et al. |
| 3,404,698 | A | 10/1968 | Rouse |
| 3,425,661 | A | 2/1969 | Mayo |
| 3,439,897 | A | 4/1969 | Priese et al. |
| 3,455,534 | A | 7/1969 | Scaramucci |
| 3,467,224 | A | 9/1969 | Curtis et al. |
| 3,472,479 | A | 10/1969 | Sherwood |
| 3,554,581 | A | 1/1971 | Mason et al. |
| 3,556,474 | A | 1/1971 | Scaramucci |
| 3,561,727 | A | 2/1971 | Scaramucci |
| 3,571,896 | A | 3/1971 | Wilkerson |
| 3,594,835 | A | 7/1971 | Wilson |
| 3,630,483 | A | 12/1971 | Canalizo |
| 3,680,188 | A | 8/1972 | Mason |
| 3,687,415 | A | 8/1972 | Turkot |
| 3,712,585 | A | 1/1973 | Grenier |
| 3,726,314 | A | 4/1973 | Moen |
| 3,789,872 | A | 2/1974 | Elliott |
| 3,813,733 | A | 6/1974 | Flohr |
| 3,830,306 | A | 8/1974 | Brown |
| 3,840,048 | A | 10/1974 | Moen |
| 3,845,876 | A | 11/1974 | Needham et al. |
| 3,845,879 | A | 11/1974 | Dernbach et al. |
| 3,881,480 | A | 5/1975 | Lafourcade |
| 3,894,718 | A | 7/1975 | Koch et al. |
| 3,901,259 | A | 8/1975 | Banbury |
| 3,916,950 | A | 11/1975 | Mongerson et al. |
| 3,933,172 | A | 1/1976 | Allen |
| 3,934,608 | A | 1/1976 | Guyton |
| 3,937,240 | A | 2/1976 | Nanny |
| 3,942,551 | A | 3/1976 | Schuller et al. |
| 3,967,842 | A | 7/1976 | Kendrick |
| 3,972,364 | A | 8/1976 | Brumm |
| 3,974,848 | A | 8/1976 | Wheatley |
| 4,022,427 | A | 5/1977 | Read |
| 4,027,696 | A | 6/1977 | Guyton |
| 4,046,164 | A | 9/1977 | Pool |
| 4,059,872 | A | 11/1977 | Delesandri |
| 4,085,770 | A | 4/1978 | Woronowicz |
| 4,086,803 | A | 5/1978 | Wheeler |
| 4,093,180 | A | 6/1978 | Strabala |
| 4,109,714 | A | 8/1978 | Greenlee et al. |
| 4,113,228 | A | 9/1978 | Frye |
| 4,146,047 | A | 3/1979 | Wood et al. |
| 4,150,847 | A | 4/1979 | De Cenzo |
| 4,158,510 | A | 6/1979 | Smith et al. |
| 4,171,095 | A | 10/1979 | Filan et al. |
| 4,218,080 | A | 8/1980 | Kendrick |
| 4,221,204 | A | 9/1980 | Meyer |
| 4,254,793 | A | 3/1981 | Scaramucci |
| 4,261,387 | A | 4/1981 | Cohn |
| 4,274,434 | A | 6/1981 | Haefele |
| 4,286,621 | A | 9/1981 | Glahn |
| 4,308,916 | A | 1/1982 | Fritz, Jr. |
| 4,321,945 | A | 3/1982 | Chabat-Courrede |
| 4,327,768 | A | 5/1982 | Behle |
| 4,332,370 | A | 6/1982 | Williams |
| 4,338,707 | A | 7/1982 | Byerly |
| 4,367,571 | A | 1/1983 | Speirs et al. |
| 4,378,849 | A | 4/1983 | Wilks |
| 4,399,830 | A | 8/1983 | Brodie |
| 4,445,255 | A | 5/1984 | Olejak |
| 4,448,148 | A | 5/1984 | Gain, Jr. |
| 4,478,388 | A | 10/1984 | George |
| 4,485,530 | A | 12/1984 | Begley et al. |
| 4,485,843 | A | 12/1984 | Wolff |
| 4,497,344 | A | 2/1985 | Kisiel |
| 4,501,291 | A | 2/1985 | Siegrist |
| 4,506,696 | A | 3/1985 | Von Pechmann |
| 4,511,120 | A | 4/1985 | Conley et al. |

(56) References Cited

U.S. PATENT DOCUMENTS

| | | | |
|---|---|---|---|
| 4,524,599 | A | 6/1985 | Bailey |
| 4,531,542 | A | 7/1985 | Looney |
| 4,572,237 | A | 2/1986 | Thompson |
| 4,590,957 | A | 5/1986 | McFarlane |
| 4,597,505 | A | 7/1986 | Mozley et al. |
| 4,605,036 | A | 8/1986 | Smith et al. |
| 4,616,803 | A | 10/1986 | Schils |
| 4,634,154 | A | 1/1987 | Arora et al. |
| 4,662,603 | A | 5/1987 | Etheridge |
| 4,667,570 | A | 5/1987 | Jensen, Jr. et al. |
| 4,705,306 | A | 11/1987 | Guido et al. |
| 4,716,930 | A | 1/1988 | Richmond et al. |
| 4,732,215 | A | 3/1988 | Hopper |
| 4,836,240 | A | 6/1989 | Elliott |
| 4,842,014 | A | 6/1989 | Strelow et al. |
| 4,848,398 | A | 7/1989 | Leach |
| 4,850,392 | A | 7/1989 | Crump et al. |
| 4,864,696 | A | 9/1989 | Mittermaier et al. |
| 4,896,367 | A | 1/1990 | Newton et al. |
| 4,915,418 | A | 4/1990 | Palatchy |
| 4,969,482 | A | 11/1990 | Perrin et al. |
| 4,993,489 | A | 2/1991 | McLeod |
| 5,025,865 | A | 6/1991 | Caldwell et al. |
| 5,046,525 | A | 9/1991 | Powell |
| 5,056,548 | A | 10/1991 | Mills |
| 5,143,112 | A | 9/1992 | Scaramucci |
| 5,161,566 | A | 11/1992 | Scaramucci |
| 5,161,570 | A | 11/1992 | Scaramucci |
| 5,165,478 | A | 11/1992 | Wilson |
| 5,178,185 | A | 1/1993 | Stehling et al. |
| 5,199,464 | A | 4/1993 | Savard |
| 5,307,835 | A | 5/1994 | Scaramucci |
| 5,341,840 | A | 8/1994 | Manson et al. |
| 5,386,847 | A | 2/1995 | Scaramucci |
| 5,417,402 | A | 5/1995 | Speybroeck |
| D360,728 | S | 7/1995 | Nozaki |
| 5,439,027 | A | 8/1995 | Layton et al. |
| 5,441,072 | A | 8/1995 | Indey et al. |
| 5,443,088 | A | 8/1995 | Hoch et al. |
| 5,462,413 | A | 10/1995 | Schroeder |
| 5,477,752 | A | 12/1995 | West et al. |
| 5,507,533 | A | 4/1996 | Mumma |
| 5,522,420 | A | 6/1996 | Martin |
| 5,526,883 | A | 6/1996 | Breaux |
| 5,538,296 | A | 7/1996 | Horton |
| 5,544,675 | A | 8/1996 | Dean |
| 5,584,315 | A | 12/1996 | Powell |
| 5,603,485 | A | 2/1997 | Schwarz |
| 5,676,348 | A | 10/1997 | Ungchusri et al. |
| 5,685,334 | A | 11/1997 | Hagan |
| 5,689,862 | A | 11/1997 | Hayes et al. |
| 5,755,427 | A | 5/1998 | Koskinas |
| 5,787,926 | A | 8/1998 | Mukumoto et al. |
| 5,791,693 | A | 8/1998 | Crawford |
| 5,832,947 | A | 11/1998 | Niemczyk |
| 5,947,152 | A | 9/1999 | Martin et al. |
| 5,957,592 | A | 9/1999 | Yamanaka |
| 5,971,007 | A | 10/1999 | Harcourt et al. |
| 5,983,826 | A | 11/1999 | Lohde |
| 6,003,837 | A | 12/1999 | Raymond, Jr. et al. |
| 6,029,693 | A | 2/2000 | Nakanishi et al. |
| 6,079,439 | A | 6/2000 | Hartley |
| 6,082,707 | A | 7/2000 | Hosie et al. |
| 6,085,572 | A | 7/2000 | McGuire, Sr. et al. |
| 6,089,531 | A | 7/2000 | Young |
| 6,155,091 | A | 12/2000 | Hayes et al. |
| 6,164,707 | A | 12/2000 | Ungchusri et al. |
| 6,209,561 | B1 | 4/2001 | Kugelev et al. |
| 6,230,733 | B1 | 5/2001 | Strelow et al. |
| 6,240,951 | B1 | 6/2001 | Yori |
| 6,250,605 | B1 | 6/2001 | Young |
| 6,290,237 | B1 | 9/2001 | Graupner |
| 6,361,051 | B1 | 3/2002 | Babin |
| 6,371,527 | B1 | 4/2002 | Ungchusri et al. |
| 6,382,247 | B1 | 5/2002 | Gundry |
| 6,387,226 | B1 | 5/2002 | Persson |
| 6,450,477 | B1 | 9/2002 | Young |
| 6,554,024 | B2 | 4/2003 | Mefford et al. |
| 6,554,249 | B2 | 4/2003 | Pang et al. |
| 6,742,538 | B1 | 6/2004 | Aderholt et al. |
| 6,752,377 | B1 | 6/2004 | Taylor |
| 6,770,177 | B2 | 8/2004 | Keller et al. |
| 6,843,265 | B2 | 1/2005 | Taylor |
| 6,848,724 | B2 | 2/2005 | Kessler |
| 6,854,704 | B1 | 2/2005 | Young |
| 6,880,567 | B2 | 4/2005 | Klaver et al. |
| 6,880,568 | B1 | 4/2005 | Taylor |
| 6,886,593 | B2 | 5/2005 | Madden et al. |
| 6,945,569 | B1 | 9/2005 | Diaz et al. |
| 6,948,526 | B2 | 9/2005 | Seder et al. |
| 6,954,569 | B2 | 10/2005 | Yang |
| 6,978,799 | B2 | 12/2005 | Kugelev et al. |
| 7,004,445 | B2 | 2/2006 | Lymberopoulos |
| 7,028,778 | B2 | 4/2006 | Krywitsky |
| 7,028,986 | B2 | 4/2006 | Young |
| 7,204,525 | B2 | 4/2007 | Matzner |
| RE39,695 | E | 6/2007 | Ungchusri et al. |
| 7,228,869 | B2 | 6/2007 | Wilhelm |
| D549,850 | S | 8/2007 | Perlman |
| 7,264,059 | B2 | 9/2007 | Akselberg |
| 7,285,190 | B2 | 10/2007 | Martin et al. |
| 7,302,961 | B2 | 12/2007 | Martin et al. |
| D570,501 | S | 6/2008 | Janesz |
| 7,398,796 | B2 | 7/2008 | Hjorth et al. |
| 7,401,819 | B2 | 7/2008 | Gibb et al. |
| 7,451,959 | B2 | 11/2008 | Matzner |
| 7,458,212 | B2 | 12/2008 | Koizumi et al. |
| 7,516,941 | B2 | 4/2009 | Combs |
| 7,549,681 | B1 | 6/2009 | Matzner |
| 7,677,526 | B2 | 3/2010 | Lymberopoulos |
| 7,819,386 | B2 | 10/2010 | Combs |
| 7,823,265 | B2 | 11/2010 | Matzner et al. |
| 7,890,276 | B2 | 2/2011 | Killion et al. |
| 7,950,409 | B2 | 5/2011 | Stokes et al. |
| 8,000,909 | B2 | 8/2011 | Danzy |
| 8,051,875 | B2 | 11/2011 | Lawrence et al. |
| D660,461 | S | 5/2012 | Kotin et al. |
| D660,984 | S | 5/2012 | Kotin et al. |
| 8,196,229 | B1 | 6/2012 | Hickok |
| D666,326 | S | 8/2012 | Sims |
| 8,261,771 | B2 | 9/2012 | Witkowski et al. |
| D675,750 | S | 2/2013 | King |
| 8,376,046 | B2 | 2/2013 | Broussard, II |
| 8,465,001 | B2 | 6/2013 | Witkowski et al. |
| 8,469,108 | B2 | 6/2013 | Kajaria et al. |
| 8,474,521 | B2 | 7/2013 | Kajaria et al. |
| 8,490,949 | B2 | 7/2013 | Lanning et al. |
| D703,294 | S | 4/2014 | Witkowski |
| 8,695,627 | B2 | 4/2014 | Kugelev et al. |
| D707,332 | S | 6/2014 | Witkowski |
| D707,797 | S | 6/2014 | Witkowski |
| 8,833,804 | B2 | 9/2014 | Myers et al. |
| 8,870,233 | B2 | 10/2014 | Matzner et al. |
| 8,978,695 | B2 | 3/2015 | Witkowski et al. |
| 8,998,168 | B2 | 4/2015 | Witkowski |
| D734,434 | S | 7/2015 | Witkowski et al. |
| 9,103,448 | B2 | 8/2015 | Witkowski et al. |
| 9,273,543 | B2 | 3/2016 | Baca et al. |
| 9,322,243 | B2 | 4/2016 | Baca et al. |
| 2002/0179876 | A1 | 12/2002 | Pang et al. |
| 2002/0185867 | A1 | 12/2002 | Stachowiak |
| 2002/0186910 | A1 | 12/2002 | Maret |
| 2003/0047944 | A1 | 3/2003 | Ungchusri et al. |
| 2003/0178067 | A1 | 9/2003 | Fredrickson et al. |
| 2004/0163716 | A1 | 8/2004 | Madden et al. |
| 2005/0087232 | A1 | 4/2005 | Kugelev |
| 2005/0121073 | A1 | 6/2005 | Carroll |
| 2005/0199286 | A1 | 9/2005 | Appleford et al. |
| 2006/0091339 | A1 | 5/2006 | Young |
| 2006/0185731 | A1 | 8/2006 | Grable et al. |
| 2006/0266422 | A1 | 11/2006 | Feenstra et al. |
| 2006/0278394 | A1 | 12/2006 | Stover |
| 2006/0283513 | A1 | 12/2006 | Kurian et al. |
| 2007/0029090 | A1 | 2/2007 | Andreychuk et al. |

(56) References Cited

U.S. PATENT DOCUMENTS

| | | | |
|---|---|---|---|
| 2007/0051411 | A1 | 3/2007 | Scaramucci et al. |
| 2007/0205387 | A1 | 9/2007 | Grau et al. |
| 2007/0262029 | A1 | 11/2007 | Yoshida et al. |
| 2007/0272308 | A1 | 11/2007 | Spears et al. |
| 2008/0039802 | A1 | 2/2008 | Vangsness et al. |
| 2008/0054204 | A1 | 3/2008 | Zhou |
| 2008/0142752 | A1 | 6/2008 | Matzner |
| 2008/0196773 | A1 | 8/2008 | Franconi |
| 2008/0264649 | A1 | 10/2008 | Crawford |
| 2008/0295910 | A1 | 12/2008 | Aleksandersen et al. |
| 2008/0308159 | A1 | 12/2008 | Stunkard |
| 2009/0008934 | A1 | 1/2009 | Matzner et al. |
| 2009/0120635 | A1 | 5/2009 | Neal |
| 2010/0154894 | A1 | 6/2010 | Kotapish et al. |
| 2010/0193057 | A1 | 8/2010 | Garner et al. |
| 2010/0258200 | A1 | 10/2010 | Walker et al. |
| 2010/0288493 | A1 | 11/2010 | Fielder, I et al. |
| 2010/0326541 | A1 | 12/2010 | Kugelev et al. |
| 2011/0036415 | A1 | 2/2011 | Lymberopoulos |
| 2011/0061871 | A1 | 3/2011 | Omvik |
| 2011/0240126 | A1 | 10/2011 | Lymberopoulos et al. |
| 2011/0272158 | A1 | 11/2011 | Neal |
| 2011/0316274 | A1 | 12/2011 | Groenlund et al. |
| 2012/0025114 | A1 | 2/2012 | Lymberopoulos et al. |
| 2012/0031494 | A1 | 2/2012 | Lymberopoulos |
| 2012/0060929 | A1 | 3/2012 | Kendrick |
| 2012/0073670 | A1 | 3/2012 | Lymberopoulos |
| 2012/0085541 | A1 | 4/2012 | Love et al. |
| 2012/0091743 | A1 | 4/2012 | Ohman, III et al. |
| 2012/0181013 | A1 | 7/2012 | Kajaria et al. |
| 2012/0181015 | A1 | 7/2012 | Kajaria et al. |
| 2012/0181016 | A1 | 7/2012 | Kajaria et al. |
| 2012/0181046 | A1 | 7/2012 | Kajaria et al. |
| 2012/0219354 | A1 | 8/2012 | Bauer et al. |
| 2012/0227983 | A1 | 9/2012 | Lymberopoulos et al. |
| 2012/0255734 | A1 | 10/2012 | Coli et al. |
| 2012/0298213 | A1 | 11/2012 | Forster et al. |
| 2012/0325332 | A1 | 12/2012 | Ball et al. |
| 2013/0000745 | A1 | 1/2013 | Witkowski et al. |
| 2013/0020519 | A1 | 1/2013 | Lymberopoulos |
| 2013/0037125 | A1 | 2/2013 | Drake et al. |
| 2013/0126152 | A1 | 5/2013 | Banks et al. |
| 2013/0248182 | A1 | 9/2013 | Chong et al. |
| 2013/0299727 | A1 | 11/2013 | Witkowski |
| 2013/0328301 | A1 | 12/2013 | McGuire |
| 2014/0048158 | A1 | 2/2014 | Baca et al. |
| 2014/0048734 | A1 | 2/2014 | Witkowski et al. |
| 2015/0000766 | A1 | 1/2015 | Arizpe et al. |
| 2015/0042088 | A1 | 2/2015 | Witkowski et al. |
| 2015/0345646 | A1 | 12/2015 | Witkowski et al. |

FOREIGN PATENT DOCUMENTS

| | | | |
|---|---|---|---|
| AU | 649744 | | 6/1994 |
| AU | 649744 | B2 | 6/1994 |
| AU | 348253 | | 5/2013 |
| CA | 2350047 | | 12/2001 |
| CA | 2635751 | A1 | 12/2001 |
| CA | 2636751 | A1 | 1/2009 |
| CA | 2636751 | A1 | 1/2009 |
| CA | 2490664 | C | 11/2009 |
| CA | 2490664 | C | 11/2009 |
| CA | 2485817 | C | 8/2010 |
| CA | 2485817 | C | 8/2010 |
| CA | 2654848 | A1 | 8/2010 |
| CA | 2654848 | A1 | 8/2010 |
| CA | 2503231 | C | 6/2011 |
| CA | 2503231 | C | 6/2011 |
| CA | 2612397 | C | 4/2013 |
| CA | 2612397 | C | 4/2013 |
| CA | 149748 | | 11/2014 |
| CA | 152956 | | 11/2014 |
| CA | 152957 | | 11/2014 |
| CA | 2764310 | C | 6/2015 |
| CN | 2118877 | U | 10/1992 |
| CN | 2118877 | U | 10/1992 |
| CN | 1137309 | A | 12/1996 |
| CN | 1137309 | A | 12/1996 |
| CN | 1225298 | A | 8/1999 |
| CN | 1225298 | A | 8/1999 |
| CN | 2426550 | Y | 4/2001 |
| CN | 2426550 | Y | 4/2001 |
| CN | 1548701 | A | 11/2004 |
| CN | 1548701 | A | 11/2004 |
| CN | 1908365 | A | 2/2007 |
| CN | 2901281 | Y | 5/2007 |
| CN | 2901281 | Y | 5/2007 |
| CN | 200999609 | Y | 1/2008 |
| CN | 200999609 | Y | 1/2008 |
| CN | 201043685 | Y | 4/2008 |
| CN | 201043685 | Y | 4/2008 |
| CN | 101205798 | A | 6/2008 |
| CN | 101205798 | A | 6/2008 |
| CN | 101258350 | A | 9/2008 |
| CN | 101258350 | A | 9/2008 |
| CN | 101303033 | A | 11/2008 |
| CN | 101303033 | A | 11/2008 |
| CN | 201162522 | Y | 12/2008 |
| CN | 101367099 | A | 2/2009 |
| CN | 101367099 | A | 2/2009 |
| CN | 201206648 | Y | 3/2009 |
| CN | 201206648 | Y | 3/2009 |
| CN | 201262043 | Y | 6/2009 |
| CN | 201262043 | Y | 6/2009 |
| CN | 101539218 | A | 9/2009 |
| CN | 101539218 | A | 9/2009 |
| CN | 101722221 | A | 6/2010 |
| CN | 101722221 | A | 6/2010 |
| CN | 201496006 | U | 6/2010 |
| CN | 201496006 | U | 6/2010 |
| CN | 201545914 | U | 8/2010 |
| CN | 201545914 | U | 8/2010 |
| CN | 201650157 | U | 11/2010 |
| CN | 201650157 | U | 11/2010 |
| CN | 201739525 | U | 2/2011 |
| CN | 201739525 | U | 2/2011 |
| CN | 201747313 | U | 2/2011 |
| CN | 201747313 | U | 2/2011 |
| CN | 202031536 | U | 11/2011 |
| CN | 202047762 | U | 11/2011 |
| CN | 202047762 | U | 11/2011 |
| CN | 102323158 | A | 1/2012 |
| CN | 102323158 | A | 1/2012 |
| CN | 202144943 | | 2/2012 |
| CN | 202208237 | U | 5/2012 |
| CN | 202208237 | U | 5/2012 |
| CN | 202255397 | U | 5/2012 |
| CN | 202255848 | U | 5/2012 |
| CN | 202255848 | U | 5/2012 |
| CN | 202255937 | U | 5/2012 |
| CN | 202718658 | | 2/2013 |
| CN | ZL2013300399164 | | 9/2013 |
| CN | ZL201330441389 | | 4/2014 |
| CN | ZL201330441389-X | | 4/2014 |
| CN | ZL201080025350.3 | | 5/2014 |
| CN | ZL201330441241.6 | | 5/2014 |
| CN | ZL2010800253503 | | 5/2014 |
| CN | ZL2013304412416 | | 5/2014 |
| DE | 1166571 | B | 3/1964 |
| DE | 1166571 | B | 3/1964 |
| DE | 2415732 | A1 | 10/1974 |
| DE | 2415732 | A1 | 10/1974 |
| DE | 2358756 | A1 | 3/1975 |
| DE | 2358756 | A1 | 3/1975 |
| DE | 2558272 | A1 | 7/1977 |
| DE | 2558272 | A1 | 7/1977 |
| DE | 2642743 | A1 | 3/1978 |
| DE | 2642743 | A1 | 3/1978 |
| DE | 218416 | A1 | 2/1985 |
| DE | 218416 | A1 | 2/1985 |
| DE | 3341643 | A1 | 5/1985 |
| DE | 3341643 | A1 | 5/1985 |
| DE | 19707228 | A1 | 8/1998 |
| DE | 19707228 | A1 | 8/1998 |

(56) References Cited

FOREIGN PATENT DOCUMENTS

| | | | |
|---|---|---|---|
| DE | 102004033453 | A1 | 1/2006 |
| DE | 102004033453 | A1 | 1/2006 |
| EA | 201171356 | A1 | 5/2012 |
| EA | 201171356 | A1 | 5/2012 |
| EC | 002185371-001 | | 2/2013 |
| EC | 002307421-0001 | | 9/2013 |
| EC | 002307421-0002 | | 9/2013 |
| EM | EU002185371-001 | | 2/2011 |
| EM | 002307421-0001 | | 9/2013 |
| EM | 002307421-0002 | | 9/2013 |
| EP | 0044619 | A1 | 1/1982 |
| EP | 0044619 | A1 | 1/1982 |
| EP | 0559131 | B1 | 1/1996 |
| EP | 0559131 | B1 | 1/1996 |
| EP | 1219942 | B1 | 8/2004 |
| EP | 1219942 | B1 | 8/2004 |
| EP | 1488867 | A1 | 12/2004 |
| EP | 1488867 | A1 | 12/2004 |
| EP | 2438338 | | 4/2015 |
| FR | 2635476 | A1 | 2/1990 |
| FR | 2635476 | A1 | 2/1990 |
| GB | 255970 | A | 8/1926 |
| GB | 255970 | A | 8/1926 |
| GB | 578008 | A | 6/1946 |
| GB | 578008 | A | 6/1946 |
| GB | 619950 | A | 3/1949 |
| GB | 619950 | A | 3/1949 |
| GB | 731895 | A | 6/1955 |
| GB | 731895 | A | 6/1955 |
| GB | 1536728 | A | 12/1978 |
| GB | 1536728 | A | 12/1978 |
| GB | 2056626 | A | 3/1981 |
| GB | 2056626 | A | 3/1981 |
| GB | 2117822 | A | 10/1983 |
| GB | 2117822 | A | 10/1983 |
| GB | 2140338 | A | 11/1984 |
| GB | 2140338 | A | 11/1984 |
| GB | 2185287 | A | 7/1987 |
| GB | 2185287 | A | 7/1987 |
| GB | 2228885 | A | 9/1990 |
| GB | 2228885 | A | 9/1990 |
| GB | 2312728 | B | 5/2000 |
| GB | 2312728 | B | 5/2000 |
| GB | 2355510 | A | 4/2001 |
| GB | 2355510 | A | 4/2001 |
| GB | 2408562 | A | 1/2005 |
| GB | 2408562 | A | 1/2005 |
| GB | 2416574 | B | 8/2008 |
| GB | 2416574 | B | 8/2008 |
| GB | 2413606 | B | 3/2009 |
| GB | 2413606 | B | 3/2009 |
| GB | 2444822 | B | 6/2011 |
| GB | 2444822 | B | 6/2011 |
| GB | 2452801 | B | 4/2012 |
| GB | 2452801 | B | 4/2012 |
| GB | 2493900 | A | 2/2013 |
| GB | 2493900 | A | 2/2013 |
| GB | 2521300 | | 6/2015 |
| IN | 251691 | | 8/2012 |
| JP | 53108873 | A | 9/1978 |
| JP | 53108873 | A | 9/1978 |
| JP | 53125261 | A | 11/1978 |
| JP | 53125261 | A | 11/1978 |
| JP | 57073187 | | 5/1982 |
| JP | 57079400 | | 5/1982 |
| JP | 61093344 | | 5/1986 |
| JP | 5033883 | A | 2/1993 |
| JP | 5033883 | A | 2/1993 |
| JP | 08075022 | | 3/1996 |
| JP | 08128536 | | 5/1996 |
| JP | 08291543 | | 5/1996 |
| JP | 08300052 | | 11/1996 |
| JP | 10175026 | | 6/1998 |
| JP | 2000330646 | | 11/2000 |
| JP | 2001355774 | | 12/2001 |
| JP | 2002098068 | | 4/2002 |
| JP | 2004190769 | A | 7/2004 |
| JP | 2004190769 | A | 7/2004 |
| JP | 2006194334 | A | 7/2006 |
| JP | 2006194334 | A | 7/2006 |
| JP | D1285004 | | 9/2006 |
| JP | 2008215626 | A | 9/2008 |
| JP | 2008215626 | A | 9/2008 |
| JP | 4996990 | B2 | 5/2012 |
| JP | 4996990 | B2 | 5/2012 |
| KR | 100540389 | B1 | 12/2005 |
| KR | 100540389 | B1 | 12/2005 |
| KR | 100540390 | B1 | 12/2005 |
| KR | 100540390 | B1 | 12/2005 |
| KR | 100540392 | B1 | 12/2005 |
| KR | 100540392 | B1 | 12/2005 |
| KR | 100621158 | B1 | 8/2006 |
| KR | 100621158 | B1 | 8/2006 |
| KR | 100716760 | B1 | 5/2007 |
| KR | 100716760 | B1 | 5/2007 |
| KR | 100832065 | B1 | 5/2008 |
| KR | 100832065 | B1 | 5/2008 |
| KR | 101191630 | B1 | 10/2012 |
| KR | 101191630 | B1 | 10/2012 |
| MX | 2011011007 | A | 2/2012 |
| MX | 2011011007 | A | 2/2012 |
| MX | 2011012944 | A | 6/2012 |
| MX | 40533 | | 12/2013 |
| MX | 324905 | | 10/2014 |
| NL | 258255 | A | 4/1964 |
| RU | 1466084 | C | 6/1995 |
| RU | 1466084 | C | 6/1995 |
| RU | 1417281 | C | 7/1995 |
| RU | 1417281 | C | 7/1995 |
| RU | 2088831 | C1 | 8/1997 |
| RU | 2088831 | C1 | 8/1997 |
| RU | 2242313 | C2 | 12/2004 |
| RU | 2242313 | C2 | 12/2004 |
| RU | 2367770 | C1 | 9/2009 |
| RU | 2367770 | C1 | 9/2009 |
| RU | 2367771 | C1 | 9/2009 |
| RU | 2367771 | C1 | 9/2009 |
| SG | 175263 | | 11/2012 |
| SG | 176534 | | 11/2012 |
| SG | D2013/186 | G | 2/2013 |
| SG | D2013/186 | G | 2/2013 |
| SU | 567001 | A1 | 7/1977 |
| SU | 567001 | A1 | 7/1977 |
| SU | 585898 | A1 | 12/1977 |
| SU | 585898 | A1 | 12/1977 |
| SU | 1391769 | A1 | 4/1988 |
| SU | 1391769 | A1 | 4/1988 |
| SU | 1721368 | A1 | 3/1992 |
| SU | 1721368 | A1 | 3/1992 |
| WO | 9713398 | A2 | 4/1997 |
| WO | WO-9713398 | A2 | 4/1997 |
| WO | WO 99/56047 | A2 | 11/1999 |
| WO | 2009023042 | A1 | 2/2009 |
| WO | WO-2009023042 | A1 | 2/2009 |
| WO | 2010080636 | A2 | 7/2010 |
| WO | WO-2010080636 | A2 | 7/2010 |
| WO | 2010123889 | A2 | 10/2010 |
| WO | WO-2010123889 | A2 | 10/2010 |
| WO | 2010141651 | A2 | 12/2010 |
| WO | 2010151680 | A2 | 12/2010 |
| WO | WO-2010141651 | A2 | 12/2010 |
| WO | WO-2010151680 | A2 | 12/2010 |
| WO | 2011095453 | A1 | 8/2011 |
| WO | WO-2011095453 | A1 | 8/2011 |
| WO | 2013023154 | A1 | 2/2013 |
| WO | WO-2013023154 | A1 | 2/2013 |
| WO | 2014028498 | A2 | 2/2014 |
| WO | 2014028795 | A2 | 2/2014 |
| WO | WO-2014028498 | | 2/2014 |
| WO | WO-2014028795 | | 2/2014 |
| WO | 2014042643 | A1 | 3/2014 |

(56) References Cited

FOREIGN PATENT DOCUMENTS

WO 2015002863 A1 1/2015
WO WO-2015002863 A1 1/2015

OTHER PUBLICATIONS

An Introduction to Rupture Disk Technology catalog, BS&B Safety Systems, 1994.
"Chinese Office Action dated Jun. 5, 2013, re App No. 2010800253503".
Co-pending U.S. Appl. No. 29/429,809, filed Aug. 16, 2012.
Co-pending U.S. Appl. No. 29/449,852, filed Mar. 15, 2013.
Co-pending U.S. Appl. No. 29/449,867, filed Mar. 15, 2013.
Co-pending U.S. Appl. No. 29/453,837, filed May 3, 2013.
Emergency Relief Valve Brochure, SPM, 1997.
"European Search Report dated Mar. 14, 2013, re corresponding EP App No. 10767632".
"Examination Report by IP India, dated Apr. 26, 2013, re App No. 251691".
"Extended European Search Report, by the EP Patent Office, dated Mar. 14, 2013, re App No. 10767632.2".
"Extended European Search Report, dated Jul. 4, 2013, re App No. 10784052.2".
"Final Office Action dated Aug. 16, 2013, by the USPTO, re U.S. Appl. No. 12/822,900".
"Final Office Action dated Jan. 31, 2012, by the USPTO, re U.S. Appl. No. 12/165,680".
"Final Office Action dated Mar. 7, 2013, by the USPTO, re U.S. Appl. No. 12/165,680".
"International Preliminary Report on Patentability dated Jul. 15, 2013, regarding PCT/US2012/050376".
International Search Report and Written Opinion for Application No. PCT/US2009/068822 dated on Aug. 9, 2010, 7 pages.
International Search Report and Written Opinion for Application No. PCT/US2010/031738 dated on Dec. 27, 2010, 7 pages.
International Search Report and Written Opinion for Application No. PCT/US2010/037156 dated Jan. 13, 2011, 8 pages.
International Search Report and Written Opinion for Application No. PCT/US2010/039834 dated Feb. 8, 2011, 6 pages.
International Search Report and Written Opinion for Application No. PCT/US2012/050376 dated Oct. 26, 2012, 10 pages.
"Notice of Allowance dated Aug. 29, 2005, by the USPTO, re U.S. Appl. No. 10/690,888".
"Notice of Allowance dated Dec. 20, 2012, by the Canadian IP Office, re App No. 2,612,397".
"Notice of Allowance dated Feb. 11, 2009, by the USPTO, re U.S. Appl. No. 11/414,984".
"Notice of Allowance dated Feb. 12, 2007, by the USPTO, re U.S. Appl. No. 11/013,486".
"Notice of Allowance dated Feb. 19, 2013, by the USPTO, re U.S. Appl. No. 12/793,194".
"Notice of Allowance dated Jul. 6, 2005, by the USPTO, re U.S. Appl. No. 10/833,859".
"Notice of Allowance dated Jun. 29, 2010, by the USPTO, re U.S. Appl. No. 11/354,663".
"Notice of Allowance dated May 16, 2012, by the USPTO, re U.S. Appl. No. 12/763,786".
"Notice of Allowance dated Sep. 23, 2008, by the USPTO, re U.S. Appl. No. 11/638,965".
"Office Action dated May 31, 2011, from the UK IP Office, re App No. GB0812086.7".
"Office Action dated Apr. 4, 2008, by the USPTO, re U.S. Appl. No. 11/638,965".
"Office Action dated Aug. 30, 2005, by the USPTO, re U.S. Appl. No. 11/013,486".
"Office Action dated Aug. 9, 2011, by the USPTO, re U.S. Appl. No. 12/165,680".
"Office Action dated Dec. 22, 2004, by the USPTO, re U.S. Appl. No. 10/833,859".
"Office Action dated Dec. 30, 1996, by the USPTO, re U.S. Appl. No. 08/643,239".
"Office Action dated Dec. 6, 2012, by the USPTO, re U.S. Appl. No. 12/822,900".
"Office Action dated Jan. 8, 2010, by the USPTO, re U.S. Appl. No. 11/354,663".
"Office Action dated Jul. 12, 2013, by the USPTO, re U.S. Appl. No. 12/165,680".
"Office Action dated Mar. 19, 2012, by the USPTO, re U.S. Appl. No. 12/642,541".
"Office Action dated Nov. 17, 1983, by the USPTO, re U.S. Appl. No. 06/419,141".
"Office Action dated Oct. 11, 2011, by the USPTO, re U.S. Appl. No. 12/763,786".
"Office Action dated Oct. 25, 2012, by the USPTO, re U.S. Appl. No. 12/793,194".
"Office Action dated Sep. 13, 2013, by the USPTO, re U.S. Appl. No. 13/608,562".
One page showing 4" Halliburton Big Inch Clamp Connection.
Pop Off Valve information, BJ 285959, BJ Services.
Reset Relief Valves brochure, Harrisburg, Inc., 1982.
SPM Flow Control, Inc., 4-Inch Integral Swivel Joint.
SPM Flow Control, Inc., "Flow Control Products and Drilling Equipment for the Worldwide Petroleum Industry," [Online] Jan. 8, 2007, <URL:www.spmflo.com>.
SPM Flow Control, Inc., High-Pressure Long Radius Swivel Joints, 2002, www.spmflo.com.
SPM Flow Control, Inc., Long Radius Swivel Joints, H2S, Operating and Maintenance Instructions, 1999.
SPM Flow Control, Inc., Long Radius Swivel Joints, Operating and Maintenance Instructions, 2004.
SPM Flow Control, Inc., Long Radius Swivel Joints, Operating and Maintenance Instructions, 2006.
SPM Flow Control, Inc., Swivel Joints, 1999, www.spmflo.com.
SPM Flow Control, Inc., Weir SPM , Long Radius Swivel Joints, 2007.
Supplementary European Search Report for Application No. EP09838004 dated Jan. 30, 2013, 4 pages.
Two-pages of Grayloc Products, Houston, Texas 77252 showing Grayloc Connectors in Extreme Service.
"U.S. Appl. No. 60/653,014, filed Feb. 15, 2005, "Flowline Torque Arm Assembly"".
"U.S. Appl. No. 60/947,738, filed Jul. 3, 2007, "Swivel Joint with Uniform Ball Bearing Requirements"".
"U.S. Appl. No. 61/170,917, filed Apr. 20, 2009, "Flowline Flapper Valve"".
"U.S. Appl. No. 61/220,067, filed Jun. 24, 2009, "Stand for Pressure Relief Valve"".
"U.S. Appl. No. 61/522,234, filed Aug. 10, 2011, "Rupture Disk Relief Valve"".
Valve illustration, Retsco Inc., 1992.
Venture Oilfield Services Ltd. Drawing Titled: Flowline's Safety Clamp.
"10 Station AFAM Trailer, FMC, Oct. 28, 2011, 6 pages".
"Australian Exam Report, dated Sep. 25, 2014, by IP Australia, re App No. 2010239366".
"Brazil Office Action, dated Jun. 3, 2014, re App No. BR3020130006611".
"Canadian Exam Report dated Jul. 29, 2014, issued by CIPO, re App No. 2636751".
"Canadian Examination Report, by CIPO, dated Feb. 10, 2014, re App No. 152956".
"Canadian Examination Report dated Apr. 28, 2014, by the CIPO, re App No. 2764310".
"Canadian Examination Report dated Feb. 7, 2014, by the CIPO, re App No. 149748".
"Second Written Opinion, by the IPEA/US, dated Jul. 28, 2014, re PCT/US2013/054741".
"European Exam Report, by the EPO, dated Apr. 8, 2014, re App No. 10784052.2".
"Final Office Action dated Apr. 25, 2014, by the USPTO, re App No. 13/608,562".

(56) References Cited

OTHER PUBLICATIONS

"Final Office Action dated Feb. 28, 2014, by the USPTO, re U.S. Appl. No. 12/165,680".
"Final Office Action dated Jan. 5, 2015, by the USPTO, re U.S. Appl. No. 13/572,293".
"Final Office Action dated Nov. 6, 2014, by the USPTO, re U.S. Appl. No. 13/965,848".
"International Preliminary Report on Patentability, by the IPEA/US, dated Nov. 17, 2014, re PCT/US2013/054741".
"International Search Report and Written Opinion by the ISA/US, dated Dec. 16, 2014, re PCT/US2014/044813".
"Notice of Allowance dated Apr. 10, 2015, by the USPTO, re U.S. Appl. No. 29/493,861".
"Notice of Allowance dated Apr. 9, 2015, by the USPTO, re U.S. Appl. No. 13/965,848".
"Notice of Allowance dated Dec. 17, 2014, by the Canadian IP Office, re App No. 2764310".
"Notice of Allowance dated Dec. 26, 2014, by the USPTO, re U.S. Appl. No. 13/918.479".
"Notice of Allowance dated Jun. 25, 2014, by the USPTO, re U.S. Appl. No. 12/165,680".
"Notice of Allowance dated Nov. 28, 2014, by the USPTO, re U.S. Appl. No. 13/608,562".
"Office Action dated Apr. 30, 2015, by the USPTO, re U.S. Appl. No. 13/886,771".
"Office Action dated Jul. 31, 2014, by the USPTO, re U.S. Appl. No. 13/965,848".
"Office Action dated Jun. 18, 2014, by the USPTO, re U.S. Appl. No. 13/572,293".
"Weir SPM Safety Iron Manifold Trailer, 2008, 2 pages".
"Canadian Examiner's Report issued Feb. 10, 2014, by CIPO, re App No. 152957".
"Eurasian Office Action issued Nov. 19, 2013, by the Eurasian Patent Office, re App No. 201171356".
"International Search Report and Written Opinion by the ISA/US, dated Feb. 7, 2014, re PCT/US2013/054741".
"Notice of Allowance dated Feb. 7, 2014, by the USPTO, re U.S. Appl. No. 29/449,852".
"Notice of Allowance dated Feb. 7, 2014, by the USPTO, re U.S. Appl. No. 29/449,867".
"Notice of Allowance dated Jan. 16, 2014, by the USPTO, re U.S. Appl. No. 29/453,837".
"Notice of Allowance dated Nov. 22, 2013, by the USPTO, re U.S. Appl. No. 12/822,900".
"Notice of Allowance dated Nov. 26, 2013, by the USPTO, re U.S. Appl. No. 29/429,809".
"Office Action dated Mar. 27, 2014, by the USPTO, re U.S. Appl. No. 13/918,479".
"Russian Office Action, dated by the Russian Patent Office, re App No. 2013500548".
"Final Office Action dated Apr. 25, 2014, by the USPTO, re U.S. Appl. No. 13/608,562".
"Advisory Action dated May 20, 2013, by the USPTO, re U.S. App No. 12/165,680, 3 pages."
"An Introduction to Rupture Disk Technology," Catalog 77-1001, BS&B Safety Systems, 1994, 3 pages.
"Australian Examination Report, dated Sep. 25, 2014, by IP Australia, re App No. 2010239366, 3 pages."
"Brazil Office Action, dated Jun. 3, 2014, by Brazilian Patent Office, re App No. BR3020130006611, 2 pages."
"Canadian Examination Report dated Apr. 28, 2014, by CIPO, re App No. 2764310, 3 pages."
"Canadian Examination Report dated Feb. 10, 2014, by CIPO, re App No. 152956, 3 pages."
"Canadian Examination Report dated Feb. 7, 2014, by CIPO, re App No. 149748, 1 page."
"Canadian Examination Report dated Jul. 29, 2014, by CIPO, re App No. 2636751, 3 pages."
"Canadian Examiner's Report dated Feb. 10, 2014, by CIPO, re App No. 152957, 3 pages."
"Canadian Notice of Allowance dated Dec. 17, 2014, by CIPO, re App No. 2764310, 1 page."
"Canadian Notice of Allowance dated Dec. 20, 2012, by CIPO, re App No. 2612397, 1 page."
"Canadian Notice of Allowance dated Jun. 22, 2015, by CIPO, re App No. 2636751, 1 page."
"Chinese Office Action dated Jun. 5, 2013, by SIPO, re App No. 2010800253503, 8 pages."
"Chinese Office Action dated Nov. 11, 2016, by SIPO, re App No. 201380054054, 13 pages."
"Second Written Opinion of the International Preliminary Examining Authority, dated Jul. 28, 2014, by the IPEA/US, re PCT/US2013/054741, 7 pages."
Emergency Relief Valve Brochure, SPM, 1997, 4 pages.
"Eurasian Office Action dated Nov. 19, 2013, by the Eurasian Patent Office, re App No. 201171356/31, 8 pages."
"European Examination Report dated Apr. 8, 2014, by the EPO, re App No. 10784052.2, 5 pages."
"European Search Report dated Jul. 4, 2013, by the EPO, re App No. 10784052.2, 7 pages."
"European Search Report dated Mar. 5, 2013, by the EPO, re App No. 10767632.2, 6 pages."
"Examination Report dated Apr. 26, 2013, by IP India, re App No. 251691, 2 pages."
International Search Report and Written Opinion for Application No. PCT/U52012/050376 dated Oct. 26, 2012, 10 pages.
"International Preliminary Report on Patentability dated Jul. 15, 2013, by the IPEA/US, re App No. PCT/US2012/050376, 28 pages."
"International Preliminary Report on Patentability dated Nov. 17, 2014, by the IPEA/US, re App No. PCT/US2013/054741, 31 pages."
"International Search Report and Written Opinion dated Dec. 16, 2014, by the ISA/US, re App No. PCT/US2014/044813, 12 pages."
"International Search Report and Written Opinion dated Feb. 7, 2017, by the ISA/US, re App No. PCT/US2013/054741, 10 pages."
"International Search Report and Written Opinion dated Jan. 23, 2015, by the ISA/EP, re App No. PCT/US2013/055257, 15 pages."
International Search Report and Written Opinion for Application No. PCT/US2009/068822 dated Aug. 9, 2010, 7 pages.
International Search Report and Written Opinion for Application No. PCT/US2010/031738 dated Dec. 27, 2010, 7 pages.
"International Search Report for Application No. PCT/US2016/37391, by ISA/US, dated Sep. 9, 2016, 2 pages."
"Notice of Allowance dated Nov. 22, 2013, by the USPTO, re U.S. Appl. No. 12/822,900, 10 pages."
"Notice of Allowance dated Apr. 10, 2015, by the USPTO, re U.S. Appl. No. 29/493,861, 8 pages."
"Notice of Allowance dated Apr. 9, 2015, by the USPTO, re U.S. Appl. No. 13/965,848, 8 pages."
"Notice of Allowance dated Aug. 29, 2005, by the USPTO, re U.S. Appl. No. 10/690,888, 7 pages."
"Notice of Allowance dated Dec. 17, 2015, by the USPTO, re U.S. Appl. No. 13/886,771, 13 pages."
"Notice of Allowance dated Dec. 26, 2014, by the USPTO, re U.S. Appl. No. 13/918,479, 10 pages."
"Notice of Allowance dated Feb. 11, 2009, by the USPTO, re U.S. Appl. No. 11/414,984, 8 pages."
"Notice of Allowance dated Feb. 12, 2007, by the USPTO, re U.S. Appl. No. 11/013,486, 4 pages."
"Notice of Allowance dated Feb. 19, 2013, by the USPTO, re U.S. Appl. No. 12/793,194, 10 pages."
"Notice of Allowance dated Feb. 7, 2014, by the USPTO, re U.S. Appl. No. 29/449,852, 31 pages."
"Notice of Allowance dated Feb. 7, 2014, by the USPTO, re U.S. Appl. No. 29/449,867, 31 pages."
"Notice of Allowance dated Jan. 16, 2014, by the USPTO, re U.S. Appl. No. 29/453,837, dated 39 pages."
"Notice of Allowance dated Jul. 6, 2005, by the USPTO, re U.S. Appl. No. 10/833,859, 4 pages."
"Notice of Allowance dated Jun. 25, 2014, by the USPTO, re U.S. Appl. No. 12/165,680, 12 pages."

(56) References Cited

OTHER PUBLICATIONS

"Notice of Allowance dated Jun. 29, 2010, by the USPTO, re U.S. Appl. No. 11/354,663, 5 pages."
"Notice of Allowance dated May 16, 2012, by the USPTO, re U.S. Appl. No. 12/763,786, 6 pages."
"Notice of Allowance dated Nov. 26, 2013, by the USPTO, re U.S. Appl. No. 29/429,809, 11 pages."
"Notice of Allowance dated Nov. 28, 2014, by the USPTO, re U.S. Appl. No. 13/608,562, 36 pages."
"Notice of Allowance dated Oct. 27, 2015, by the USPTO, re U.S. Appl. No. 13/964,863, 5 pages."
"Notice of Allowance dated Sep. 23, 2008, by the USPTO, re U.S. Appl. No. 11/638,965, 6 pages."
"Office Action dated Apr. 25, 2014, by the USPTO, re U.S. Appl. No. 13/608,562, 31 pages."
"Office Action dated Apr. 30, 2015, by the USPTO, re U.S. Appl. No. 13/886,771, 13 pages."
"Office Action dated Apr. 4, 2008, by the USPTO, re U.S. Appl. No. 11/638,965, 10 pages."
"Office Action dated Aug. 16, 2013, by the USPTO, re U.S. Appl. No. 12/822,900, 15 pages."
"Office Action dated Aug. 30, 2005, by the USPTO, re U.S. Appl. No. 11/013,486, 12 pages."
"Office Action dated Aug. 9, 2011, by the USPTO, re U.S. Appl. No. 12/165,680, 18 pages."
"Office Action dated Dec. 22, 2004, by the USPTO, re U.S. Appl. No. 10/833,859, 5 pages."
"Office Action dated Dec. 30, 1996, by the USPTO, re U.S. Appl. No. 08/643,239, 11 pages."
"Office Action dated Dec. 6, 2012, by the USPTO, re U.S. Appl. No. 12/822,900, 20 pages."
"Action dated Feb. 2, 2013, by the Russian Patent Office, re App No. 2013500548, 2 pages."
"Office Action dated Feb. 28, 2014, by the USPTO, re U.S. Appl. No. 12/165,680, 60 pages."
"Office Action dated Jan. 31, 2012, by the USPTO, re U.S. Appl. No. 12/165,680, 28 pages."
"Offcie Action dated Jan. 5, 2015, by the USPTO, re U.S. Appl. No. 13/572,293, 12 pages."
"Office Action dated Jan. 8, 2010, by the USPTO, re U.S. Appl. No. 11/354,663, 6 pages."
"Office Action dated Jul. 10, 2015, by the USPTO, re U.S. Appl. No. 13/964,863, 36 pages."
"Office Action dated Jul. 12, 2013, by the USPTO, re U.S. Appl. No. 12/165,680, 24 pages."
"Office Action dated Jul. 31, 2014, by the USPTO, re U.S. Appl. No. 13/965,848, 44 pages."
"Office Action dated Jun. 18, 2014, by the USPTO, re U.S. Appl. No. 13/572,293, 29 pages."
"Office Action dated Mar. 19, 2012, by the USPTO, re U.S. Appl. No. 12/642,541, 15 pages."
"Office Action dated Mar. 27, 2014, by the USPTO, re U.S. Appl. No. 13/918,479, 13 pages."
"Office Action dated May 31, 2011, from the UK IP Office, re App No. GB0812086.7, 2 pages."
"Office Action dated Nov. 17, 1983, by the USPTO, re U.S. Appl. No. 06/419,141, 4 pages."
"Office Action dated Oct. 11, 2011, by the USPTO, re U.S. Appl. No. 12/763,786, 9 pages."
"Office Action dated Oct. 25, 2012, by the USPTO, re U.S. Appl. No. 12/793,194, 8 pages."
"Office Action dated Sep. 13, 2013, by the USPTO, re U.S. Appl. No. 13/608,562, 12 pages."
"Office Action dated Mar. 7, 2013, by the USPTO, re U.S. Appl. No. 12/165,680, 23 pages."
"Office Action dated Nov. 6, 2014, by the USPTO, re U.S. Appl. No. 13/965,848, 12 page."
"Oksanen, K. et al, "Singer Model DLA-RPS—Air Operated Surge Anticipating Electrically Timed Sewage Relief Valve; Schematic A-8809A," Singer Valve, Dec. 8, 2010, XP055159354, 3 pages."
""Product Data Sheet, 10 Station AFAM Trailer," FMC Technologies (www.fmctechnologies.com), PD550002076-A, Oct. 28, 2011, 6 pages."
Reset Relief Valves brochure, Harrisburg, Inc., 1982, 2 pages.
SPM Flow Control, Inc., "Flow Control Products and Drilling Equipment for the Worldwide Petroleum Industry," [Online] Jan. 8, 2007, 28 pages.
SPM Flow Control, Inc., "High-Pressure Long Radius Swivel Joints," 2002, 1 page.
SPM Flow Control, Inc., "Swivel Joints," 1999, 1 page.
SPM Flow Control, Inc., "Long Radius Swivel Joints," 2007, 5 pages.
SPM Flow Control, Inc., "Long Radius Swivel Joints—Operating and Maintenance Instructions," 2006, 6 pages.
SPM Flow Control, Inc., "Long Radius Swivel Joints—Operating and Maintenance Instructions—H2S," 1999, 6 pages.
SPM Flow Control, Inc., "Long Radius Swivel Joints—Operating and Maintenance Instructions," 2004, 4 pages.
""The Strength of Screw Threads Under Repeated Tension" by Herbert F. Moore and Proctor E. Henwood, University of Illinois Engineering Experiment Station, Bulletin No. 264, Mar. 1934 (Mar. 1934), 20 pages."
"U.S. Appl. No. 60/653,014, filed Feb. 15, 2005, "Flowline Torque Arm Assembly," 16 pages."
"U.S. Appl. No. 60/947,738, filed Jul. 3, 2007, "Swivel Joint with Uniform Ball Bearing Requirements," 12 pages."
"U.S. Appl. No. 61/170,917, filed Apr. 20, 2009, "Flowline Flapper Valve," 9 pages."
"U.S. Appl. No. 61/220,067, filed Jun. 24, 2009, "Stand for Pressure Relief Valve," 12 pages."
"U.S. Appl. No. 61/522,234, filed Aug. 10, 2011, "Rupture Disk Relief Valve," 23 pages."
Valve illustration, Retsco Inc., 1992, 1 page.
"Written Opinion for Application No. PCT/US2016/37391 by ISA/US dated Sep. 9, 2016, 8 pages."
"Weir SPM Safety Iron Manifold Trailer, 2008, 2 pages."
""Windlass Engineers & Services," Hammer Unions (Windglass Engineers), Mar. 11, 2015, 8 pages."
Oksanen: "Singer Model DLA-RPS Air Operated Surge Anticipating Electrically Timed Sewage Relief Valve," Dec. 8, 2010, XP055159354. 3 pages.
First Office Action re related Chinese Application No. 201380054054.X, dated Nov. 18, 2016, 13 pages.
International Search Report and Written Opinion re related application PCT/US2013/055257, dated Jan. 23, 2015, 13 pages.
International Preliminary Report on Patentability re related application PCT/US2013/055257, dated Feb. 26, 2015, 10 pages.

AUTOMATED RELIEF VALVE CONTROL SYSTEM AND METHOD

CROSS-REFERENCE TO RELATED APPLICATIONS

This application is a continuation of U.S. patent application Ser. No. 13/964,863, filed Aug. 12, 2013, which is a continuation-in-part of U.S. patent application Ser. No. 13/886,771, filed May 3, 2013, which claims priority to and the benefit of the filing date of U.S. patent application Ser. No. 61/684,394, filed Aug. 17, 2012, the entire disclosures of which are hereby incorporated herein by reference.

TECHNICAL FIELD

This disclosure relates in general to a valve control system and method and, in particular, to an automated relief valve control system and method.

BACKGROUND OF THE DISCLOSURE

Hydraulic fracturing to stimulate a subterranean formation includes injecting a fracturing fluid through a wellbore into the formation at a pressure and flow rate at least sufficient to overcome the pressure of the reservoir and extend fractures into the formation. A high pressure line directs the fracturing fluid through a wellhead and into the wellbore. The fracturing fluid is a mixture of a liquid and a media, and is typically injected into the wellbore at high pressures, in the range of about 10,000 to 30,000 psi.

To protect the integrity of the wellhead and to reduce equipment failures, such as blown tubing or pumps, a relief valve associated with the high pressure line in the system maintains pressure at or below a rated limit for the associated fracturing equipment. However, the relief valve has traditionally been difficult to calibrate in the field and is subject to wear as pressure fluctuations occur, resulting in valve chatter, increased wear, and ultimately a less than accurate popoff pressure limit on the relief valve. Therefore, what is needed is an apparatus or method that addresses one or more of the foregoing issues, among others.

SUMMARY

In a first aspect, there is provided a pressure relief valve system for use in a downhole operation, the pressure relief valve system including a gas source, and a pressure relief valve having a closed state and an open state, wherein the pressure relief valve is configured to relieve pressure from high pressure tubing extending between a pump and a wellhead, and wherein the pressure relief valve is configured to be maintained in the closed state with a pressurized gas from the gas source. The pressure relief valve system further includes a sensor to detect pressure in the high pressure tubing, and a controller having a pressure threshold stored therein, the controller being configured to receive data from the sensor and compare the pressure in the high pressure tubing to the stored pressure threshold. A valve actuation system is in communication with the gas source, the pressure relief valve, and the controller, the valve actuation system being configured to change the state of the pressure relief valve from the closed state to the open state in response to a command signal from the controller. The valve actuation system includes an input portion connected to the gas source; an output portion connected to the pressure relief valve; and at least one of the following: a dump valve configured to open so that the state of the pressure relief valve changes from the closed state to the open state; and a reducing valve disposed between the input portion and the output portion, the reducing valve being configured to adjust the pressure in the output portion based on data from the controller.

In an exemplary embodiment, the controller is configured to emit the command signal when the controller determines that the pressure in the high pressure tubing exceeds the stored pressure threshold.

In another exemplary embodiment, the valve actuation system includes both the dump valve and the reducing valve.

In yet another exemplary embodiment, the valve actuation system includes a second controller configured to determine a suitable pressure for the output portion, the second controller configured to adjust the reducing valve to achieve the suitable pressure in the output portion.

In certain exemplary embodiments, the suitable pressure is about 105-150% of a gas pressure threshold that opens the relief valve.

In an exemplary embodiment, the pressure relief valve system includes a first pressure transmitter configured to detect pressure of the output portion and a second pressure transmitter configured to detect pressure of the input portion.

In another exemplary embodiment, the controller is configured to receive an operator input that sets the stored pressure threshold, the controller also being configured to receive an operator input that sets a reset pressure for the pressure relief valve.

In yet another exemplary embodiment, the controller is configured to emit the command signal when the controller determines that a nominal pressure in the high pressure tubing over a predetermined increment of time exceeds the stored pressure threshold.

In certain exemplary embodiments, the controller is configured to determine that the nominal pressure in the high pressure tubing over the predetermined increment of time exceeds the stored pressure threshold by averaging the pressure in the high pressure tubing over the predetermined increment of time and comparing the average pressure to the stored pressure threshold.

In an exemplary embodiment, the controller is configured to determine that the nominal pressure in the high pressure tubing over the predetermined increment of time exceeds the stored pressure threshold by detecting that the pressure in the high pressure tubing exceeds the stored pressure threshold, starting an internal timer that runs for the predetermined increment of time, and detecting that the pressure in the high pressure tubing continues to exceed the stored pressure threshold at the conclusion of the predetermined increment of time.

In another exemplary embodiment, the controller receives data directly from the sensor.

In yet another exemplary embodiment, the gas source includes one or more nitrogen tanks.

In certain exemplary embodiments, the pressure relief valve system includes a regulator unit carrying the valve actuation system and the gas source in a single transportable unit.

In an exemplary embodiment, the regulator unit includes a skid.

In another exemplary embodiment, the regulator unit includes a hose reel carrying a hose extendable between the valve actuation system and the pressure relief valve and configured to place the valve actuation system and the pressure relief valve in fluid communication; and a first data cable reel carrying a first data cable extendable between the valve actuation system and the controller and configured to place the valve actuation system and the controller in electrical communication.

In yet another exemplary embodiment, the pressure relief valve system includes a second data cable reel removably mounted to the regulator unit and carrying a second data cable extendable between the sensor and the controller and configured to place the sensor and the controller in electrical communication.

In a second aspect, there is provided a pressure relief valve system for use in a downhole operation, the pressure relief valve system including a pressure relief valve configured to relieve pressure from high pressure tubing extending between a pump and a wellhead; a sensor to detect pressure in the high pressure tubing; and a controller having a pressure threshold stored therein, the controller being configured to receive data from the sensor and compare the detected pressure to the stored pressure threshold. A valve actuation system is in communication with the pressure relief valve and the controller, the valve actuation system being configured to change the state of the pressure relief valve from a closed state to an open state in response to a command signal from the controller. The controller is configured to emit the command signal when the controller determines that a nominal pressure in the high pressure tubing over a predetermined increment of time exceeds the stored pressure threshold.

In an exemplary embodiment, the controller is configured to determine that the nominal pressure in the high pressure tubing over the predetermined increment of time exceeds the stored pressure threshold by averaging the pressure in the high pressure tubing over the predetermined increment of time and comparing the average pressure to the stored pressure threshold.

In another exemplary embodiment, the controller is configured to determine that the nominal pressure in the high pressure tubing over the predetermined increment of time exceeds the stored pressure threshold by detecting that the pressure in the high pressure tubing exceeds the stored pressure threshold, starting an internal timer that runs for the predetermined increment of time, and detecting that the pressure in the high pressure tubing continues to exceed the stored pressure threshold at the conclusion of the predetermined increment of time.

In yet another exemplary embodiment, the valve actuation system includes a dump valve that receives the command signal from the controller.

In certain exemplary embodiments, the valve actuation system includes an input portion adapted to be connected to a gas source; an output portion connected to the pressure relief valve; and a reducing valve disposed between the input portion and the output portion, the reducing valve being configured to adjust the pressure in the output portion based on data from the controller.

In an exemplary embodiment, the valve actuation system includes a second controller configured to determine a suitable pressure for the output portion, the second controller configured to adjust the reducing valve to achieve the suitable pressure in the output portion.

In another exemplary embodiment, the suitable pressure is about 105-150% of a gas pressure threshold that opens the relief valve.

In yet another exemplary embodiment, the pressure relief valve system includes a first pressure transmitter configured to detect pressure of the output portion and a second pressure transmitter configured to detect pressure of the input portion.

In certain exemplary embodiments, the controller is configured to receive an operator input that sets the stored pressure threshold, and is configured to receive an operator input that sets a reset pressure for the pressure relief valve.

In an exemplary embodiment, the pressure relief valve system includes a gas source, the gas source providing gas pressurized to maintain the state of the pressure relief valve in the closed state.

In a third aspect, there is provided a method of controlling a pressure relief valve in a downhole operation, the method including maintaining a pressure relief valve in a closed state with a pressurized gas from a gas source; detecting, with a pressure sensor disposed adjacent the pressure relief valve, a fluid pressure in a high pressure tube extending between a pump and a wellhead; comparing the fluid pressure in the high pressure tube to a stored fluid pressure threshold; sending a signal to open a dump valve if the fluid pressure in the high pressure tube exceeds the fluid pressure threshold; and opening the dump valve to lower the pressure of the pressurized gas until the pressure relief valve changes from the closed state to the open state.

In an exemplary embodiment, the method includes prompting an operator to enter the fluid pressure threshold; prompting an operator to enter a reset pressure threshold; and closing the dump valve to increase the pressure of the pressurized gas when the fluid pressure in the high pressure tube is below the reset pressure threshold.

In another exemplary embodiment, the method includes regulating the pressure of the pressurized gas that maintains the pressure relief valve in a closed state with a reducing valve; and controlling the reducing valve with an electronic controller in response to the fluid pressure threshold.

In yet another exemplary embodiment, regulating the pressure of the pressurized gas includes maintaining the pressurized gas at a pressure about 105-150% of a gas pressure threshold that opens the relief valve.

In certain exemplary embodiments, the method includes changing the pressure of the pressurized gas with the reducing valve in response to changes in the fluid pressure threshold.

In an exemplary embodiment, comparing the fluid pressure in the high pressure tube to the stored fluid pressure threshold includes comparing a nominal pressure in the high pressure tube over a predetermined time increment to the stored fluid pressure threshold.

In another exemplary embodiment, wherein comparing the nominal pressure in the high pressure tube over the predetermined time increment to the stored fluid pressure threshold includes: detecting that the fluid pressure in the high pressure tube exceeds the stored pressure threshold; starting an internal timer that runs for the predetermined time increment of time; and comparing the pressure in the high pressure tubing to the stored pressure threshold at the conclusion of the predetermined time increment.

In yet another exemplary embodiment, comparing the nominal pressure in the high pressure tube over the predetermined time increment to the stored fluid pressure threshold includes: averaging the fluid pressure in the high pressure tube over the predetermined time increment to obtain an average pressure; and comparing the average pressure to the fluid pressure threshold.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1:
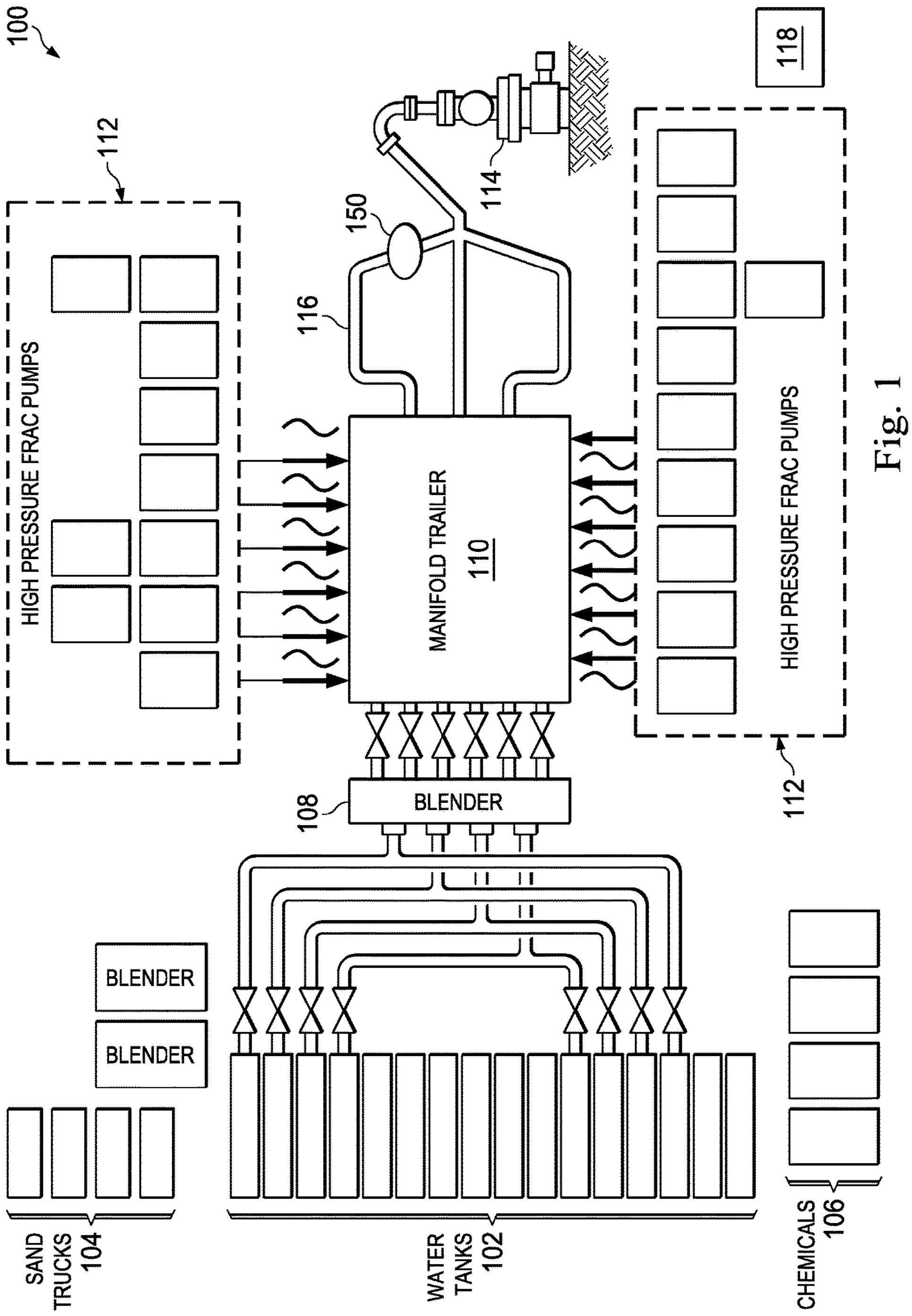
FIG. 1 is a schematic illustrating an exemplary frac site according to an exemplary aspect of the present disclosure.

FIG. 1 illustrates an exemplary frac site incorporating the subject matter of the present disclosure. The frac site, referenced herein by the numeral 100, includes water trucks 102, sand trucks 104, chemicals 106, a blender 108, a manifold trailer 110, and high pressure frac pumps 112. The water, sand, and chemicals are introduced into the blender 108 to create slurry referenced herein as a fracturing or fracing fluid. The fracing fluid is introduced into the manifold trailer 110 and fed from the manifold trailer to high pressure frac pumps 112.

The manifold trailer 110 includes a low pressure section and a high pressure section. The low pressure section transfers low pressure from the blender 108 to the frac pumps 112. The high pressure section transfers the fracing fluid from the frac pumps 112 to a wellhead 114. The high pressure frac pumps 112 receive the mixed fluid from the manifold trailer 110 through a suction manifold and energize the fluid through the power end/fluid end portion of the frac pump 112. Depending on the capacity of the frac pump 112, this pressure can reach up to 15,000 to 30,000 psi. The high pressure fracing fluid is directed from the manifold trailer 110 to the wellhead 114 via a high pressure tubing 116.

In the example of FIG. 1, the frac site 100 includes a data van 118 that operates as a main communication center for the entire frac site 100. The data van 118 may be configured to monitor all aspects of the fracing operation and may be in communication with transducers and controllers disposed about the frac site 100. From the data van 118, an operator may be able to monitor pressures, flows, blending, and other information relating to the frac site 100.

The exemplary frac site in FIG. 1 includes a relief valve system 150 configured to monitor pressure in the high pressure tubing 116 and configured to relieve system pressure in the event of over-pressurization from the pumps 112 or the wellhead 114. The relief valve system 150 is described in greater detail with reference to FIG. 2.

Figure 2:
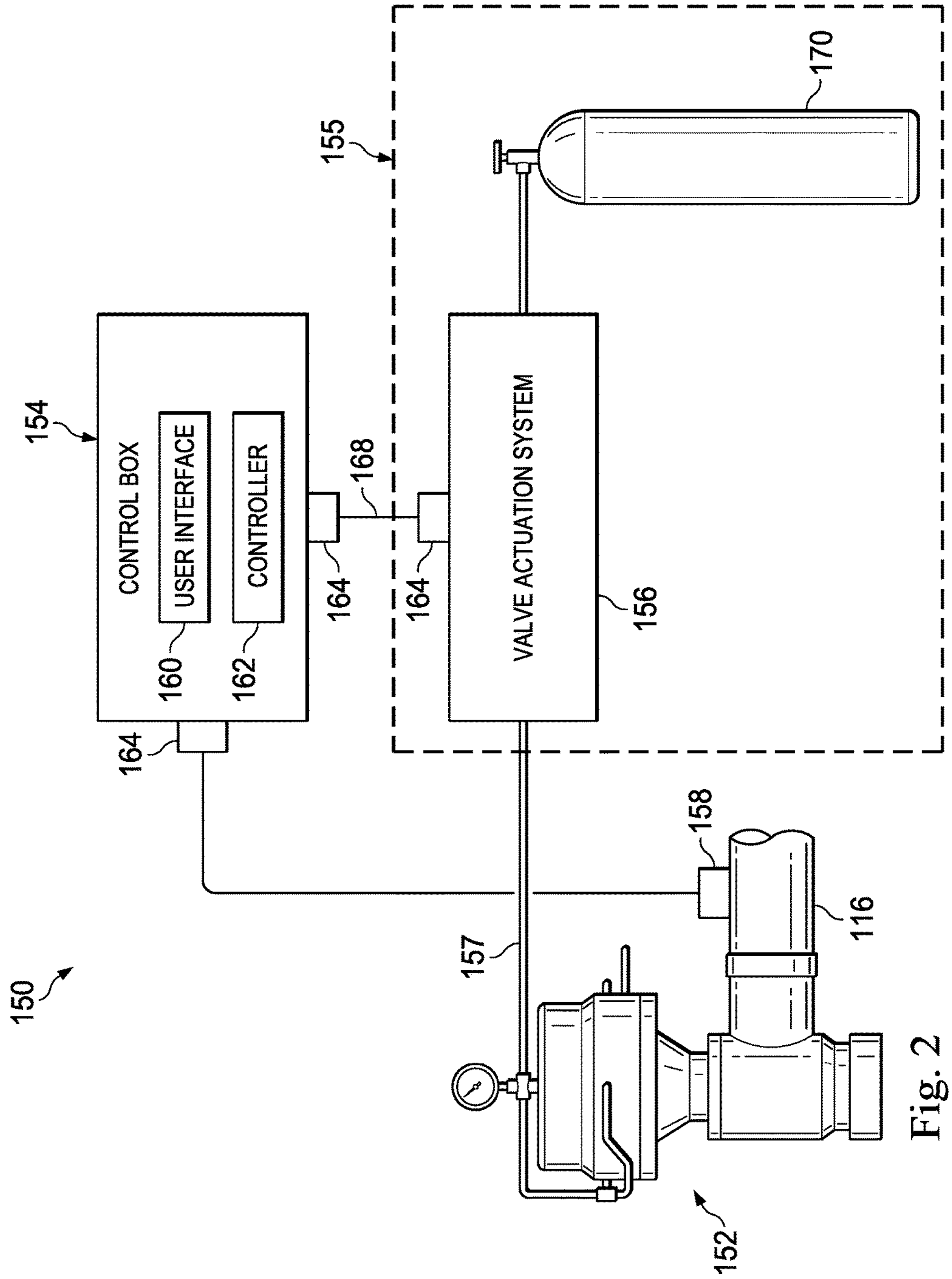
FIG. 2 is a block diagram of a relief valve system according to an exemplary aspect of the present disclosure.

FIG. 2 shows a block diagram of the relief valve system 150. It includes a relief valve 152, a control box 154, and a regulator unit 155. The regular unit 155 includes a valve actuation system 156 and an actuation fluid source 170; in an exemplary embodiment, the actuation fluid source 170 is a gas source such as, for example, one or more nitrogen tanks. The relief valve 152 is disposed along the high pressure tubing 116 and may relieve system pressure in the event of over-pressurization from the frac pumps 112 or the wellhead 114. As such, it may provide overpressure protection for reciprocating pumps, treating lines, pressure vessels, and other equipment operating under high-pressure, high-flow conditions.

In several exemplary embodiments, instead of, or in addition to, one or more nitrogen tanks, the actuation fluid source 170 includes one or more other gas sources such as, for example, one or more compressors that provide compressed air, one or more air tanks, one or more other gas bottles, cartridges or tanks, one or more accumulators, or any combination thereof. In several exemplary embodiments, the actuation fluid source 170 includes one or more pumps. In several exemplary embodiments, the actuation fluid source 170 includes one or more of several types of pressurized fluid sources.

In an exemplary embodiment, the actuation fluid source 170 is a self-contained, pressurized gas source, the operation of which causes almost no moisture, or only small amounts of moisture or negligible moisture, to be present in the actuation fluid source 170, the valve actuation system 156, and the connection therebetween; as a result, the risk of corrosion and/or freezing is reduced. Since the actuation fluid source 170 is a self-contained pressurized gas source, pumps, compressors, or the like are not required; in several exemplary embodiments, such a self-contained pressurized gas source includes one or more nitrogen tanks. In several exemplary embodiments, such a self-contained pressurized gas source includes one or more nitrogen tanks and, as a result, the water content of the compressed nitrogen is about 0.003% by volume (in contrast, the water content in compressed air is about 2% by volume).

A pressure sensor 158 is arranged on the high pressure tubing 116 to detect pressure therethrough. In some embodiments, the pressure sensor 158 may be disposed at the inlet of the pressure relief valve 152, adjacent the pressure relief valve 152, or at other locations. The pressure sensor 158 may be any type of pressure sensor and in different embodiments may include one or more of piezoelectric sensors, capacitive sensors, electromagnetic sensors, potation sensors, thermal sensors, resonant sensors, among others. In one embodiment, it is an intrinsically safe pressure transducer. The sensor 158 may be configured to provide electronic dampening of the signal to reduce false readings due to pressure pulsations. In an exemplary embodiment, the sensor 158 is an intrinsically safe, high sampling rate pressure transducer, the signals or data transmission from which may be dampened, as will be described in further detail below.

The control box 154 allows an operator to have direct access to data collected by the pressure sensor 158 and the valve actuation system 156. In some embodiments, the control box 154 is disposed within the data van 118 spaced apart from the pressure relief valve 152. It may be powered by any power source, and in some embodiments, is powered by 110 AC. The control box 154 may include a user interface 160 and a controller 162. In some embodiments, the user interface 160 includes a combined display and input system, such as, for example, a touch screen LCD. However, other embodiments use alternative user interfaces, including, for example, a separate display screen and a separate input system, including, for example, a keyboard, mouse, trackball, joystick, or other user input device. The user interface 160 may also include other elements including, for example, a speaker, a power switch, an emergency stop switch, and a strobe or alarm light. In an exemplary embodiment, the user interface 160 and the controller 162 may be disposed in the data van 118, and may be powered by a back-up power supply disposed in the data van 188 (such as a DC power supply) if the primary power source fails. In several exemplary embodiments, the control box 154 or components thereof include a backup power supply. In several exemplary embodiments, the back-up power supply is a battery. In the event of a power outage, such as an outage in the data van 118, the backup power supply will be enabled and will power the system.

The controller 162 may include a processor and memory and may be configured to detect, monitor, and control the relief valve system 150. In some embodiments the processor is an integrated circuit with power, input, and output pins capable of performing logic functions. The processor may control different components performing different functions. The memory may be a semiconductor memory that interfaces with the processor. In one example, the processor can write data and commands to and read data and commands from the memory. For example, the processor can be configured to detect, read, or receive data from the pressure sensor 158 and write that data to the memory. In this manner, a series of detected or tracked pressure readings can be stored in the memory. The processor may be also capable of performing other basic memory functions, such as erasing or overwriting the memory, detecting when the memory is full, and other common functions associated with managing semiconductor memory. In an exemplary embodiment, the controller 162 includes an internal timer, which is configured to start and run for a predetermined increment of time, under conditions to be described in further detail below.

The control box 154 may also include a plurality of connectors 164 allowing connection to other components of the relief valve system 150, such as the valve actuation system 156 and the sensor 158. Although any suitable connectors may be used, one embodiment of a suitable connector includes a Circular MIL Spec 32P18 Wall mount socket connector. Other embodiments include a wireless connector including a transmitter and receiver that receives and transmits data to the valve actuation system 156. In one wired embodiment, the connector 164 may connect to the valve actuation system 156 using a data cable 168, such as a 150 ft weatherproof data cable. Other cable types and of course, other lengths are contemplated. The 150 ft data cable is sufficient length to extend from the valve actuation system 156 to the control box 154, which may be disposed at a different location at the frac site, such as in the data van 118.

The valve actuation system 156 is used to open and close the relief valve 152 under the control or instruction of the controller 162. It connects to the actuation fluid source 170, such as the nitrogen tank, although other fluids, including other gases or air may be used. Nitrogen from the actuation fluid source 170 provides pressurized actuation fluid that is regulated in the valve actuation system 156 to open and close the pressure relief valve 152 when pressure in the high pressure tubing 116 exceeds a pre-stored threshold. The valve actuation system 156 also connects to the relief valve 152 through a tubing referenced herein as a hose 157. Like the control box 154, the valve actuation system 156 includes a connector 164 for connecting to the cable 168 for communication between the control box 154 and the valve actuation system 156. In some embodiments, the valve actuation system 156 may receive data from the sensor 158 and may send the collected data, either before or after processing, to the control box 154.

In some embodiments, the valve actuation system 156 is a box that contains components configured to direct actuation fluid, such as the nitrogen, to the pressure relief valve 152 to open and close the valve 152. One embodiment of the valve actuation system 156 is shown in FIGS. 3-6.

Figure 3:
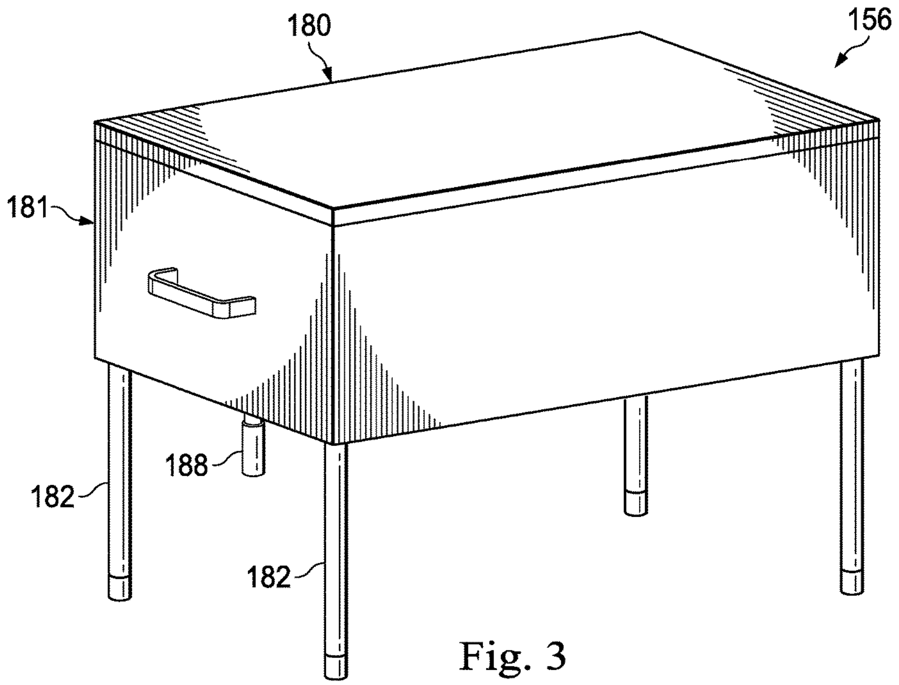
FIG. 3 is an illustration of a perspective view showing a valve actuation system according to an exemplary aspect of the present disclosure.
Figure 4:
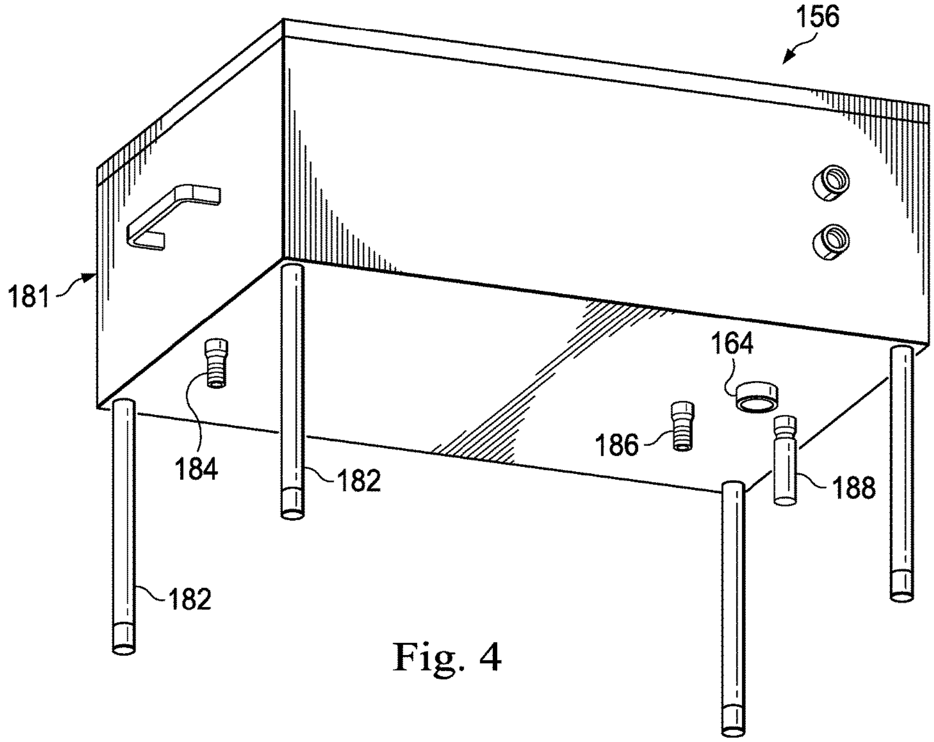
FIG. 4 is an illustration of another perspective view of the valve actuation system of FIG. 3 according to an exemplary aspect of the present disclosure.

FIGS. 3 and 4 show different views of the valve actuation system 156 as it may be used. The valve actuation system 156 may include a housing 180 containing components that provide control of the pressure relief valve 152. In one embodiment, the housing 180 includes a main box 181 and legs 182 that maintain the components off the ground, and permit easier access to the components. In one embodiment, the legs 182 are removable. Fittings and connectors, including the connector 164 are disposed in the bottom of the main box 181. Because the fittings and connectors extend from the bottom of the main box 181, the cables, hoses, and wires are protected from kinking or bending due to gravitational forces acting on them. Accordingly, the arrangement of the connectors on the bottom allows the cables, hoses, and wires to suspend vertically from the main box 181, preventing excessive strain on the cables. In addition, at least some protection from the elements, such as rain, may also result from the arrangement.

In this example, the arrangement of connectors includes a gas inlet portion 184, a gas outlet portion 186, and a dump outlet 188. The gas inlet 186 is configured to connect to an actuation fluid source 170; in an exemplary embodiment, the actuation fluid source 170 is a gas source such as, for example, one or more nitrogen tanks. The gas outlet portion 186 connects to the relief valve 152. The dump outlet 188 is an outlet from the valve actuation system 156 to atmosphere. Therefore, in the embodiment shown, it does not require a connection.

Figure 5:
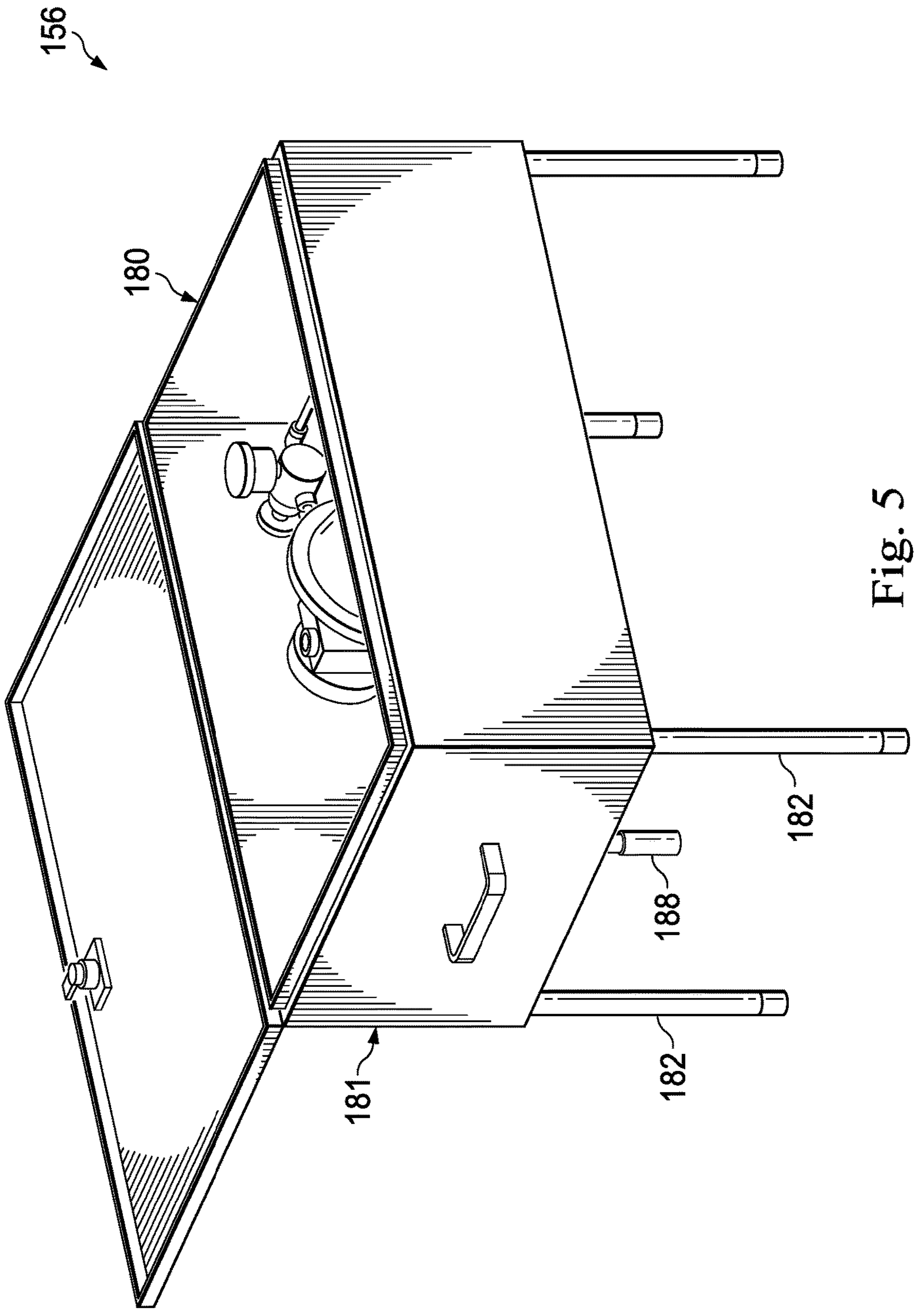
FIG. 5 is an illustration of another perspective view of the valve actuation system of FIG. 3 with a door opened according to an exemplary aspect of the present disclosure.
Figure 6:
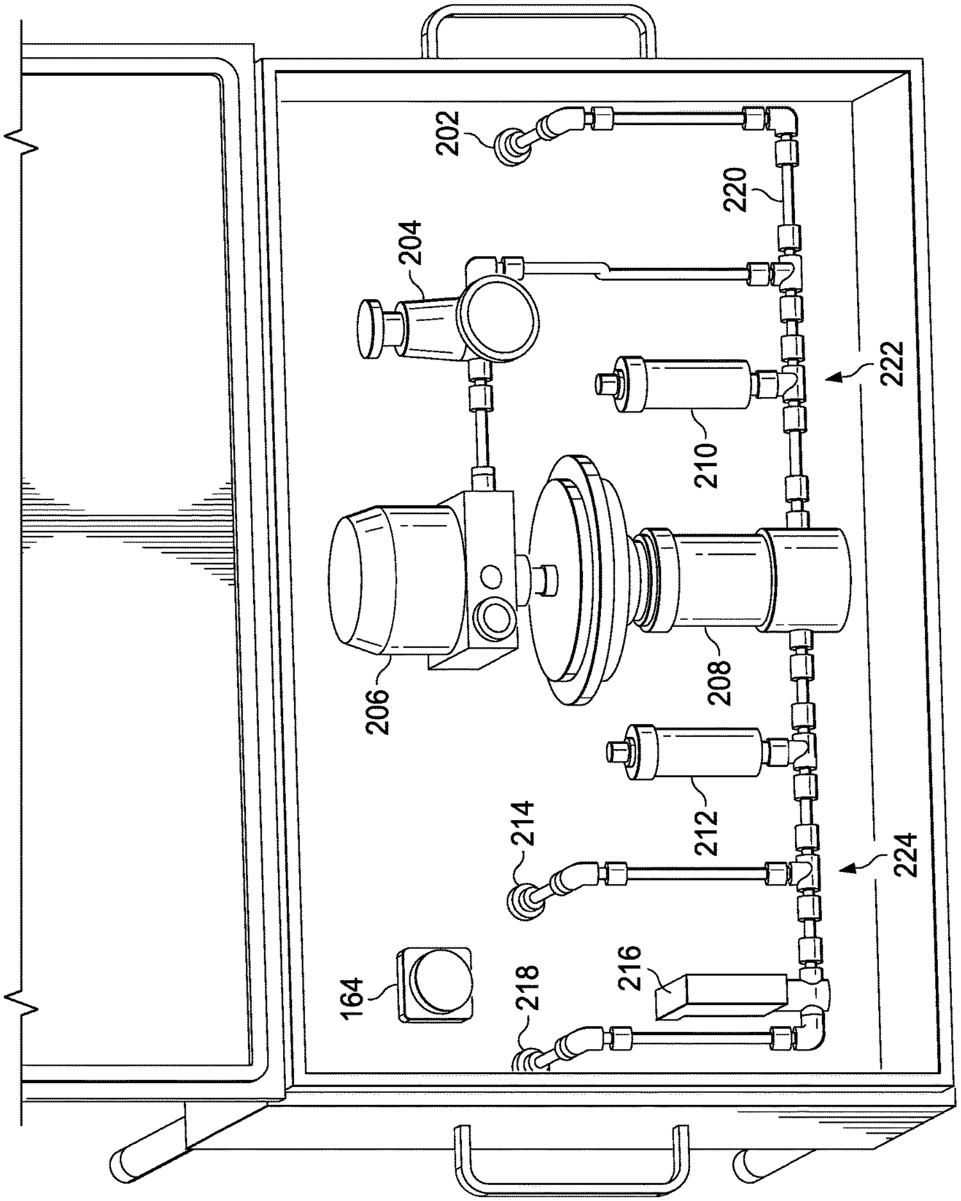
FIG. 6 is an illustration of a top view of the valve actuation system of FIG. 3 with the door opened according to an exemplary aspect of the present disclosure.
Figure 7:
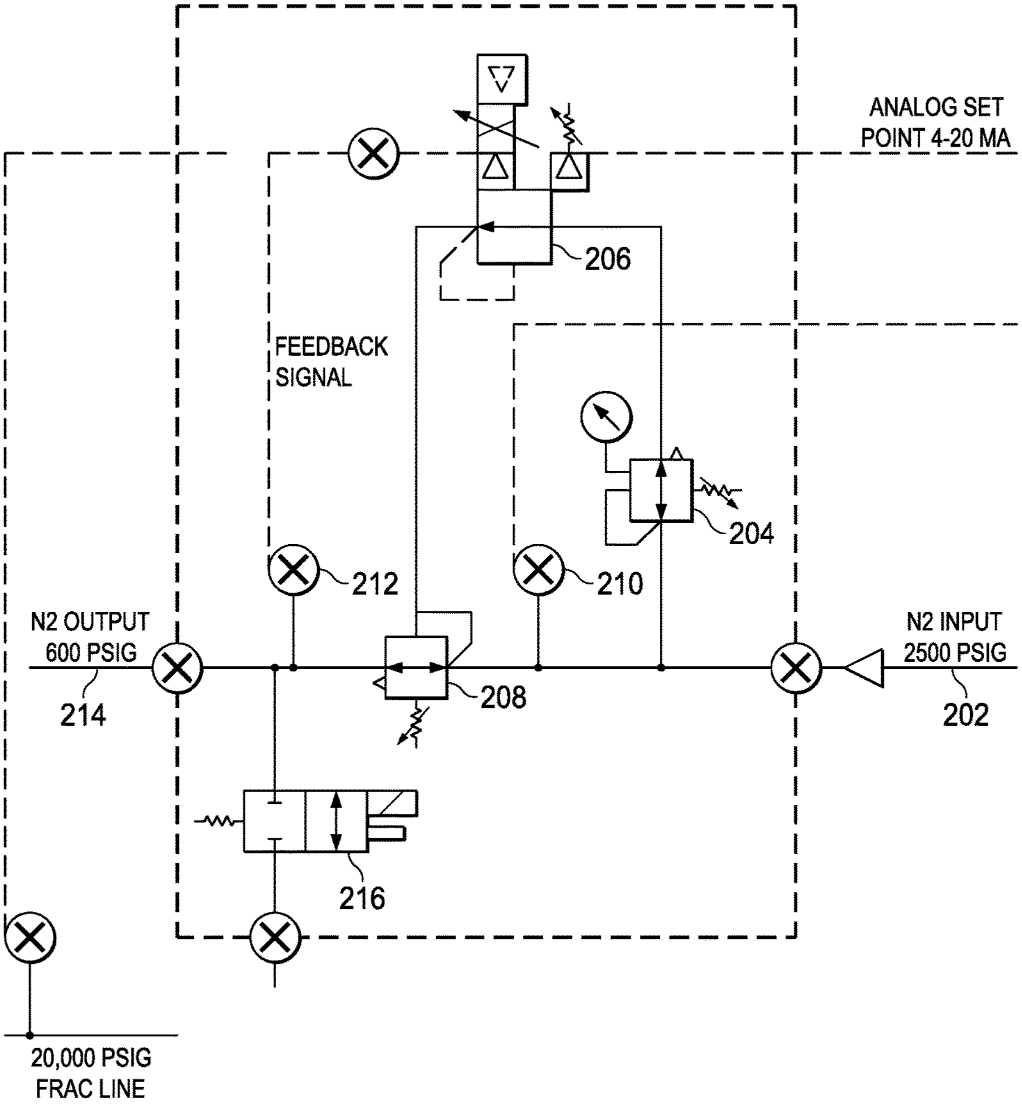
FIG. 7 is a schematic showing the hydraulic operation of components of the valve actuation system of FIG. 6 according to an exemplary aspect of the present disclosure.

FIGS. 5-7 show additional details of the valve actuation system. FIG. 5 shows that the main box 181 includes a lid that may be opened to provide access to components of the valve actuation system 156. FIG. 6 shows a view looking into the main box 181 and showing additional components of the valve actuation system 156. FIG. 7 shows a schematic of the hydraulic actuating of various components of the valve actuation system 156.

With reference to FIGS. 6 and 7, the valve actuation system 156 includes a gas input 202, an input pressure regulator 204, an electronic pressure controller 206, a main line reducing valve 208, first pressure transmitter 210, a second pressure transmitter 212, a gas output 214, a dump valve 216, a dump output 218, and the connector 164. In some embodiments, these components are intrinsically safe or explosion proof. Flow pipes 220 connect the various components as shown in FIG. 6. For purposes of explanation, the flow pipes 220 will be described as having an input portion 222 on the upstream side of the main line reducing valve 208 and an output portion 224 on the downstream side of the main line reducing valve 208.

The gas input 202 connects to the gas inlet portion 184 (FIG. 4) and receives pressurized gas from the actuation fluid source 170; in an exemplary embodiment, the actuation fluid source 170 is a gas source such as, for example, one or more nitrogen tanks. The first pressure transmitter 210 monitors the pressure of the gas in the input portion 222 of the flow pipes 220. Signals representing the gas pressure are sent from the valve actuation system 156 to the controller 162 for processing and analysis.

The input pressure regulator 204 regulates gas pressure being sent to the electronic pressure controller 206. It may be set at any value and in one embodiment is configured to provide 100 psi to the electronic pressure controller 206 in order to ensure operation of the electronic pressure controller 206. Because the electronic pressure controller 206 may require voltage to maintain its settings, the gas flow to the electronic pressure controller 206 through the input pressure regulator 204 provides a continuous pressure that helps maintain the electronic pressure controller 206 in a satisfactory working condition.

The electronic pressure controller 206 is configured to control the main line reducing valve 208 depending on desired popoff values for the pressure relief valve 152. It may include logic that sets the main line reducing valve 208 to increase the efficiency of opening the pressure relief valve 152 when the relief valve popoff pressure is exceeded. This is described further below.

The main line reducing valve 208 reduces gas pressure in the flow pipes 220 from the input portion 222 of the flow tubes to the output portion 224 of the flow tubes. Accordingly, the input portion 222 may be maintained at a high pressure to assure availability of enough gas and a high enough pressure to control the relief valve 152 and the output portion 224 may be at a lower pressure that provides the actual control of the relief valve 152. In one example, the input portion 222 may be maintained at the actuation fluid source 170 pressure, which may be in the range of, for example, 1,500 to 2,500 psig. The main line reducing valve 208 may reduce the pressure so that the outlet portion 224 of the flow tube is under about, for example, 600 psig. Other values are contemplated depending on the desired control.

The second pressure transmitter 212 monitors the pressure of the gas in the output portion 224 of the flow pipes 220. Signals representing the gas pressure detected by the second pressure transmitter 212 are sent from the valve actuation system 156 to the control box 154 for processing and analysis.

The gas output 214 connects to the gas outlet portion 186 (FIG. 4) via the hose 157 which is connected directly to the pressure relief valve 152. Pressure in the hose 157 maintains the relief valve 152 in a closed state. The dump valve 216 is configured to open and close based on the instructions from the controller 162. As will be explained below, this will occur when pressure of the fracing fluid in the high pressure tubing 116 (FIG. 1) exceeds a preset threshold. When the dump valve 216 opens, pressurized gas in the output portion 224 of the flow tubes is released through the dump valve 216 to the dump output 218. The dump output 218 connects to the dump outlet 188 (FIG. 4) and releases gas into the air. At the same time, the sudden release of pressure in the output portion of the flow tubes 224 results in a loss of pressure at the relief valve 152, which allows the relief valve 152 to open, relieving pressure within the high pressure tubing 116. The relief valve 152 will stay open until the dump valve 216 closes, thereby allowing the output portion 224 of the flow tubes to re-pressurize. When the output portion 224 re-pressurizes, the relief valve 152 closes. The pressure valve actuation system 156 also may include an intrinsically safe surge protector, circuit breakers, and other components.

In some embodiments, the user interface 160 displays pressure information including, for example, the actuation fluid source pressure, the frac pressure, an indication of whether the relief valve is open or closed, and other information.

Figure 8:
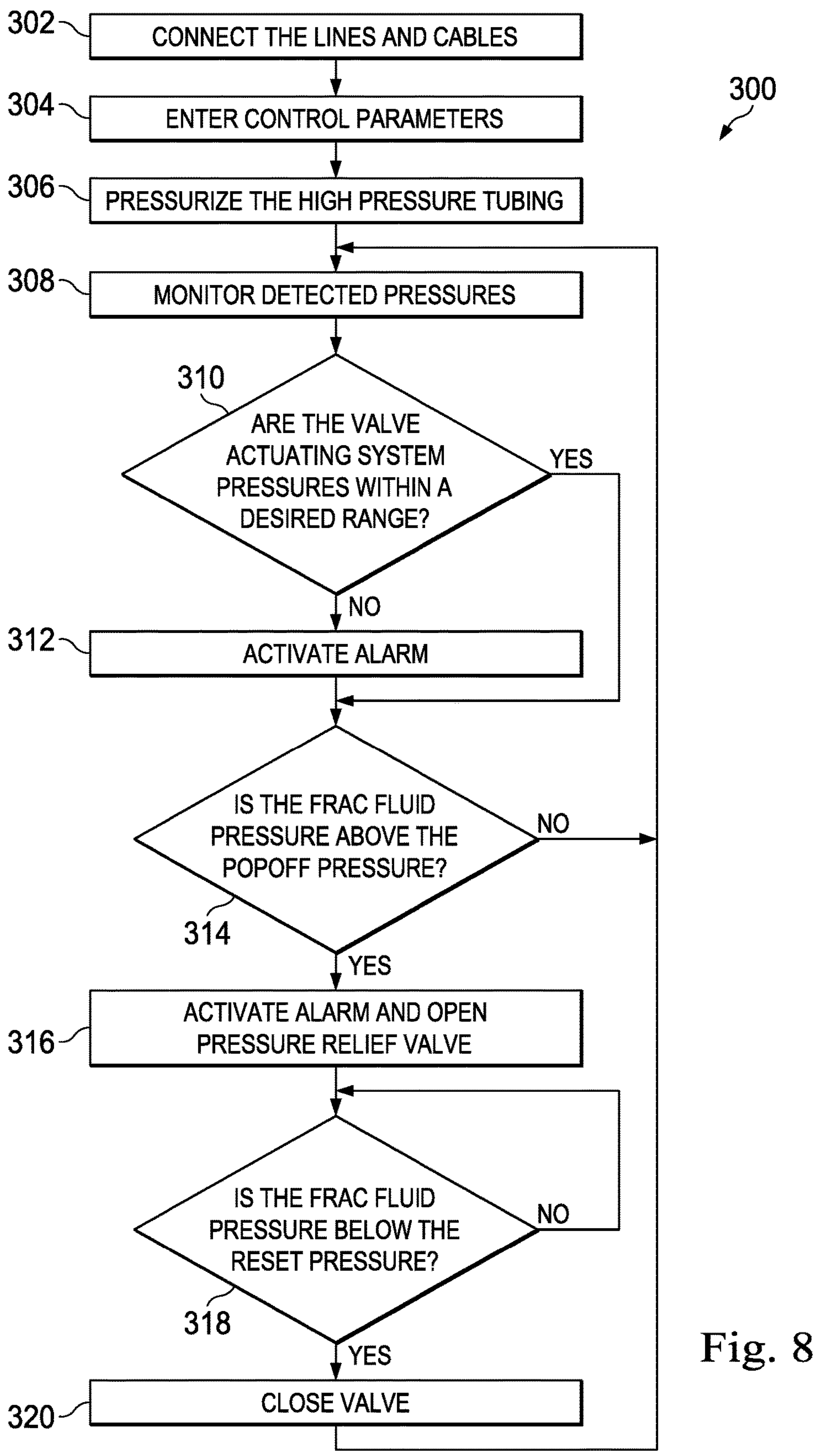
FIG. 8 is a flow chart illustrating a method of using the relief valve system in a frac site according to an exemplary embodiment of the present disclosure.

FIG. 8 is a flow chart showing an exemplary method 300 of using the relief valve system 150 as a part of the fracing equipment at the frac site 100.

The method 300 starts at a step 302 when a user connects the gas lines and cables. Connecting the gas lines includes connecting the actuation fluid source 170, such as one or more nitrogen tanks or other pressurized gas to the relief valve system 150. As described above, this may include connecting the gas supply to the gas inlet portion 184. In addition, the gas outlet portion 186 is connected to the relief valve 152. In addition, the pressure sensor 158 is connected to the control box 154, and the valve actuation system 156 is connected to the control box 154. In some embodiments, the valve actuation system 156 is disposed in relatively close proximity to the relief valve 152 and the control box 154 is disposed elsewhere at the frac site 100, and in one embodiment, is disposed in the data van 118.

At a step 304, the controller 162 may prompt an operator to enter information relating to control parameters for the relief valve 152. For example, in one embodiment, the controller 162 may prompt the user, via the user interface 160, to enter the number of relief valves that the operator wants to control with the relief valve system 150. In some embodiments, the relief valve system 150 may be used to control multiple relief valves. In one embodiment, the relief valve system 150 controls up to three relief valves. In another embodiment, the relief valve system 150 controls up to five relief valves. The relief valve system 150 may control any number of valves.

After the operator enters the number of valves to be controlled, the controller 162 may prompt the user to enter a desired popoff pressure corresponding to the desired pressure at which the relief valve 152 will be opened, and this pressure threshold is then stored by the controller 162. In some embodiments, this may be in the range of about 15,000 psig, although larger and smaller values may be entered.

The controller 162 may send the popoff pressure to the electronic pressure controller 206 of the valve actuation system 156. Based on the popoff pressure value, the electronic pressure controller 206 will receive its setting from the controller 162. The setting may be calculated using logic or may have tables stored therein that indicate a suitable gas pressure for the output portion 224 of the flow tubes to control the pressure relief valve 152. The electronic pressure controller 206 may then adjust the main line reducing valve 208 to provide the suitable gas pressure to the output portion 224. The suitable pressure for the output portion is a pressure that allows the pressure in the output portion 224 to quickly drop below the pressure required to open the valve 152. For example only, if the selected popoff pressure is 15,000 psi, then the pressure relief valve 152 may open when the gas pressure in the output portion 224 falls below 414 psi. The suitable pressure for the output portion 224 may then be set at, for example, at about 497 psi. For comparison, if the selected popoff pressure is 1,000 psi, then the pressure relief valve 152 may open when the gas pressure in the output portion 224 falls below 28 psi. The suitable pressure for the output portion 224 may then be set at, for example, at about 34 psi. Setting the pressure for the output portion 224 too high might result in an overly long delay between the time the dump valve 216 opens and the time the relief valve 152 opens. Setting the pressure for the output portion 224 only slightly above the pressure that opens the relief valve 152 ensures a high level of responsiveness because only a small pressure shift is needed to permit the relief valve to move from a closed state to an open state.

In some embodiments, the electronic pressure controller 206 may adjust the main line reducing valve 208 to provide a pressure within the output portion 224 of about 105-150% of the gas pressure threshold that opens the relief valve 152. In other embodiments, the range is about 101-200% of the gas pressure threshold that opens the relief valve 152. In one embodiment, the suitable pressure is about 120% of the gas pressure threshold that opens the relief valve 152. In an exemplary embodiment, the suitable pressure is about 15% over, or about 115% of, the gas pressure threshold that opens the relief valve 152. Other values are contemplated. Other embodiments do not employ the electronic pressure controller 206 and always use the same gas pressure in the output portion 224 regardless of the setting of the popoff pressure. In an exemplary embodiment, the suitable pressure within the output portion 224 is such that the closed state of the relief valve 152 is maintained because the suitable pressure is above the equilibrium point of the pressure relief valve 152, and is such that the pressure relief valve 152 may be moved from the closed state to the open state in a manual mode by activating the pressure relief valve 152 directly from the data van 118, rather than employing the valve actuation system 156. In an exemplary embodiment, the suitable pressure within the output portion 224 is about 15% over, or about 115% of, the gas pressure threshold that opens the relief valve 152 such that the closed state of the relief valve 152 is maintained because the suitable pressure is above the equilibrium point of the pressure relief valve 152, and is such that the pressure relief valve 152 may be moved from the closed state to the open state in a manual mode by activating the pressure relief valve 152 directly from the data van 118, rather than employing the valve actuation system 156. In an exemplary embodiment, the suitable pressure within the output portion 224 is about 12-18% over, or about 112-118% of, the gas pressure threshold that opens the relief valve 152 such that the closed state of the relief valve 152 is maintained because the suitable pressure is above the equilibrium point of the pressure relief valve 152, and is such that the pressure relief valve 152 may be moved from the closed state to the open state in a manual mode by activating the pressure relief valve 152 directly from the data van 118, rather than employing the valve actuation system 156.

The controller 162 may then prompt the operator to enter predetermined time increments in which the system pressure will be monitored before it opens the valve 152. In some examples, this may selected to be in the range between about 0.001 to 3 seconds. In some other embodiments, the time increment may be selected within the range of about 0.1 to 1 second. Other ranges are still contemplated, including, for example, only a range of about 4 to about 10 seconds. Yet other increment values are contemplated, including shorter and longer increments depending on the desire of the operator. In some embodiments, the increment is selected to be minimal so that the valve 152 responds nearly instantaneously when pressures exceed the set popoff pressure.

During use, the controller 162 may receive data regarding the instantaneous pressure within the high pressure tubing 116 from the pressure sensor 158. Since the pressure may fluctuate rapidly or may have pressure spikes, the instantaneous pressure may seem volatile while not exposing any components of the fracing system to failure loading. In addition, the pressure sensor signals themselves may have some noise affecting accuracy of the sensor reading. Accordingly, in order to avoid opening the valve whenever a small spike or signal noise indicates that the pressure exceeded the set popoff pressure, the data transmission or signal from the pressure sensor 158 to the controller 162 may be dampened to reduce false readings indicating that the frac fluid pressure in the high pressure tubing 116 is above the popoff pressure of the pressure relief valve 152. Such false readings may occur due to pressure pulsations, pressure spikes, signal noise, etc. More particularly, in several exemplary embodiments, the data transmission or signal from the pressure sensor 158 to the controller 162 may be dampened by determining whether a nominal pressure of the frac fluid in the high pressure tubing 116 is over the popoff pressure of the pressure relief valve 152. In several exemplary embodiments, the controller 162 is configured to determine whether the nominal pressure of the frac fluid in the high pressure tubing 116 is above the popoff pressure of the relief valve 152.

In an exemplary embodiment, to determine whether the nominal pressure of the frac fluid in the high pressure tubing 116 is over the popoff pressure, the controller 162 may be programmed to determine an average pressure taken over a predetermined increment of time. For example, a small pressure spike might momentarily exceed the popoff pressure, but the average pressure over a three second increment may be below the popoff pressure. In such an instance, the controller 162 may be programmed to determine that the nominal pressure is not above the popoff pressure, and thus to not take action to open the pressure relief valve 152; as a result, the fracing process may continue uninterrupted. However, if the average pressure over the same increment exceeds the popoff pressure, the controller 162 may determine that the nominal pressure is above the popoff pressure and thus generate a control signal to open the pressure relief valve 152. This provides many advantages over a system that does not use electronic control of its pressure relief valve because it may reduce the occurrence of valve chatter as the valve responds to pressure spikes. This in turn may increase reliability, reduce wear, and increase the overall robustness of the system.

In an alternative exemplary embodiment, to determine whether the nominal pressure of the frac fluid in the high pressure tubing 116 is above the popoff pressure of the pressure relief valve 152, the controller 162 may be programmed to start an internal timer when the controller 162 detects that the frac fluid pressure in the high pressure tubing 116 is over the popoff pressure of the pressure relief valve 152. The internal timer may run for a predetermined increment of time such as, for example, 200 milliseconds or any other time increment. At the conclusion of the predetermined increment of time, the controller 162 detects whether the frac fluid pressure in the high pressure tubing 116 continues to exceed the popoff pressure. If so, the controller 162 is programmed to determine that the nominal pressure is above the popoff pressure, and to generate a control signal to open the pressure relief valve 152. If the pressure is not over the popoff pressure, the controller 162 is programmed to determine that the nominal pressure is not over the popoff pressure, and thus to not take action to open the pressure relief valve 152 because the initial detection that started the internal timer may have been due to pressure pulsations, pressure spikes, signal noise, etc. This provides many advantages over a system that does not use electronic control of its pressure relief valve because it may reduce the occurrence of valve chatter as the valve responds to pressure spikes. This in turn may increase reliability, reduce wear, and increase the overall robustness of the system.

The controller 162 may then prompt the user to enter a reset pressure via the user interface 160. A reset pressure is the pressure at which the valve 152 will be closed. In one embodiment, the popoff pressure is 1,500 psig and the reset pressure is 1450 psig. Accordingly, the relief valve 152 may open at 1,500 psig and may close when the pressure drops below 1,450 psig. In other embodiments, the reset pressure is set at or near 0 psig. In such embodiments, the relief valve 152 will not reset until substantially all pressure is removed from the system. The reset pressure may be set at any value between the popoff pressure and zero, as desired. In one aspect, the controller 162 is programmed to not allow a reset pressure to be entered that is higher than the popoff pressure.

At step 306, the operator may pressurize the high pressure tubing 116. This may include powering up the fracing equipment, including the blender 108 and the high pressure frac pumps 112. As pressure begins to mount in the high pressure tubing 116, the relief valve system 150 may monitor detected settings, as indicated at step 308.

Monitoring detected pressures may include monitoring the pressure in the high pressure tubing 116 with the pressure sensor 158 and receiving data indicative of the pressure in the high pressure tubing. It also may include monitoring the gas pressure in the input portion 222 of the flow tubes in the valve actuation system 156. This pressure may be monitored because a decrease in pressure at the input portion 222 of the flow tubes may influence the ability of the valve actuation system 150 to actuate the relief valve 152. Accordingly, in one embodiment, the pressure detected by the first pressure transmitter 210 may be compared to a stored pressure threshold to determine whether the pressure is at a satisfactory level. In one example, the pressure threshold is set at 1,000 psig. However, other threshold values are contemplated, both higher and lower.

The controller 162 also may monitor the gas pressure in the output portion 224 of the flow tubes in the valve actuation system 156. This pressure may be monitored because, like the input portion 222 discussed above, a decrease in pressure at the output portion 224 of the flow tubes may influence the ability of the valve actuation system 150 to actuate the relief valve 152. Accordingly the pressure detected by the second pressure transmitter 212 may be compared to a stored pressure threshold to determine whether the pressure is at a satisfactory level. In one example, the pressure threshold for the output portion 224 of the flow tubes is set at 600 psig. However, other threshold values are contemplated, both higher and lower, and this may adjust with changes to the main line reducing valve 208.

At a step 310, the controller 162 may determine whether the detected pressures of the valve actuation system 156 (including one or both of the first and second pressure transmitters 210, 212) are above the preset pressure thresholds. If one or both is below the preset pressure thresholds, the controller 162 may alert the operator by activating an alarm, at a step 312. It may send a visual alert to the user interface 160, such as a red warning beacon at a display screen or a flashing strobe light, may activate an audible alert such as a buzzer or sound through the speaker of the user interface, or other alert, such as a tactile alert. In some embodiments, it may take action by controlling the frac site to reduce pump pressures, or may take other action until the pressures are restored to values above the thresholds. If the pressure transmitter 210 sends a signal to the controller 162 that is below the 1,000 psi minimum required nitrogen pressure, the controller will activate the alarm until the nitrogen bottle is replaced with another bottle. If pressure transmitter 212 sends a signal that doesn't match the corresponding nitrogen pressure/system pressure setting, the controller will re-check the inputted popoff pressure and send the signal to the electronic pressure controller. This will only occur if the pressure sensor 158 does not read an overpressure. In some embodiments, the alarm will continue until an operator enters an acknowledgement at the user interface 160. In some aspects, the system also activates an alarm if the controller 162 is not receiving a signal from the pressure transducer. This may be an indication that the transducer or the data cable is not properly connected. An alarm also may be activated if main power is lost. In one aspect when power is lost, the user may acknowledge the alarm at the user interface 160, and the system 150 will continue to operate using back-up power.

At a step 314, the controller 162 also may detect whether the fracing fluid pressure in the high pressure tubing 116 is below the popoff pressure (the pressure threshold stored by the controller 162). In several exemplary embodiments, the step 314 may include receiving data from the pressure sensor 158 and comparing the average pressure over a time increment or comparing instantaneous measured pressure within the high pressure tubing 116 to the preset popoff pressure.

In several exemplary embodiments, the step 314 may include dampening the signal or data transmission from the pressure sensor 158 to determine whether the nominal pressure of the frac fluid in the high pressure tubing 116 is above the popoff pressure of the pressure relief valve. At the step 314, in an exemplary embodiment, determining whether the nominal pressure is above the popoff pressure may include comparing the average pressure over a predetermined time increment to the popoff pressure. At the step 314, in an exemplary embodiment, determining whether the nominal pressure is above the popoff pressure may include detecting that the frac fluid pressure is above the popoff pressure, starting an internal timer that runs for a predetermined time increment, and detecting whether the frac fluid pressure is still above the popoff pressure at the end of the predetermined time increment; if so, the nominal pressure is above the popoff pressure.

At a step 316, if the fracing fluid pressure is over the desired popoff pressure, then the controller 162 may activate an alarm and open the pressure relief valve at a step 316. The alarm may be a visual, audible, or other alarm as discussed above. The system 150 may open the pressure relief valve 152 by sending a control signal from the controller 162 to the dump valve 216. The dump valve 216 may open, thereby releasing the gas pressure in the output portion 224 of the flow tubes, allowing the relief valve 152 to open. This of course releases pressure in the high pressure tubing 116.

At a step 318, the pressure sensor 158 continues to monitor pressure in the high pressure tubing 116. When the pressure reaches or drops below the reset threshold, the controller 162 closes the dump valve 216. As such, pressure again builds within the output portion 224 of the flow tubes, which then ultimately closes the pressure relief valve 152, as indicated at a step 320.

In several exemplary embodiments, the relief valve system 150 may provide several levels of redundancy with respect to ensuring that pressure relief valve 152 can be opened, if necessary or desired, in the event of unforeseen equipment failure or other circumstances. More particularly, in an exemplary embodiment, the data van 118 includes a back-up power supply, such as a DC power supply, which supplies electrical power to the user interface 160 and the controller 162 in the event the primary source of electrical power thereto fails; the back-up power supply supplies enough electrical power to give personnel time to determine whether to open the pressure relief valve 152 or take another course of action. Further, in several exemplary embodiments, if the electrically-powered components of the valve actuation system 156 are no longer supplied electrical power, the dump valve 216 opens, causing the relief valve 152 to open. In an exemplary embodiment, the dump valve 216 includes an electrically-powered solenoid, which defaults to an open position when electrical power is no longer supplied thereto; as a result, the dump valve 216 opens, causing the relief valve 152 to open. Still further, in several exemplary embodiments, if the relief valve system 150 malfunctions in some way, the relief valve 152 will still open when the pressure reaches the percentage above, or of, the gas pressure threshold that opens the relief valve 152. Yet still further, in several exemplary embodiments, the relief valve 152 may be opened in a manual mode by activating the pressure relief valve 152 directly from the data van 118, rather than employing the valve actuation system 156.

Figure 9:
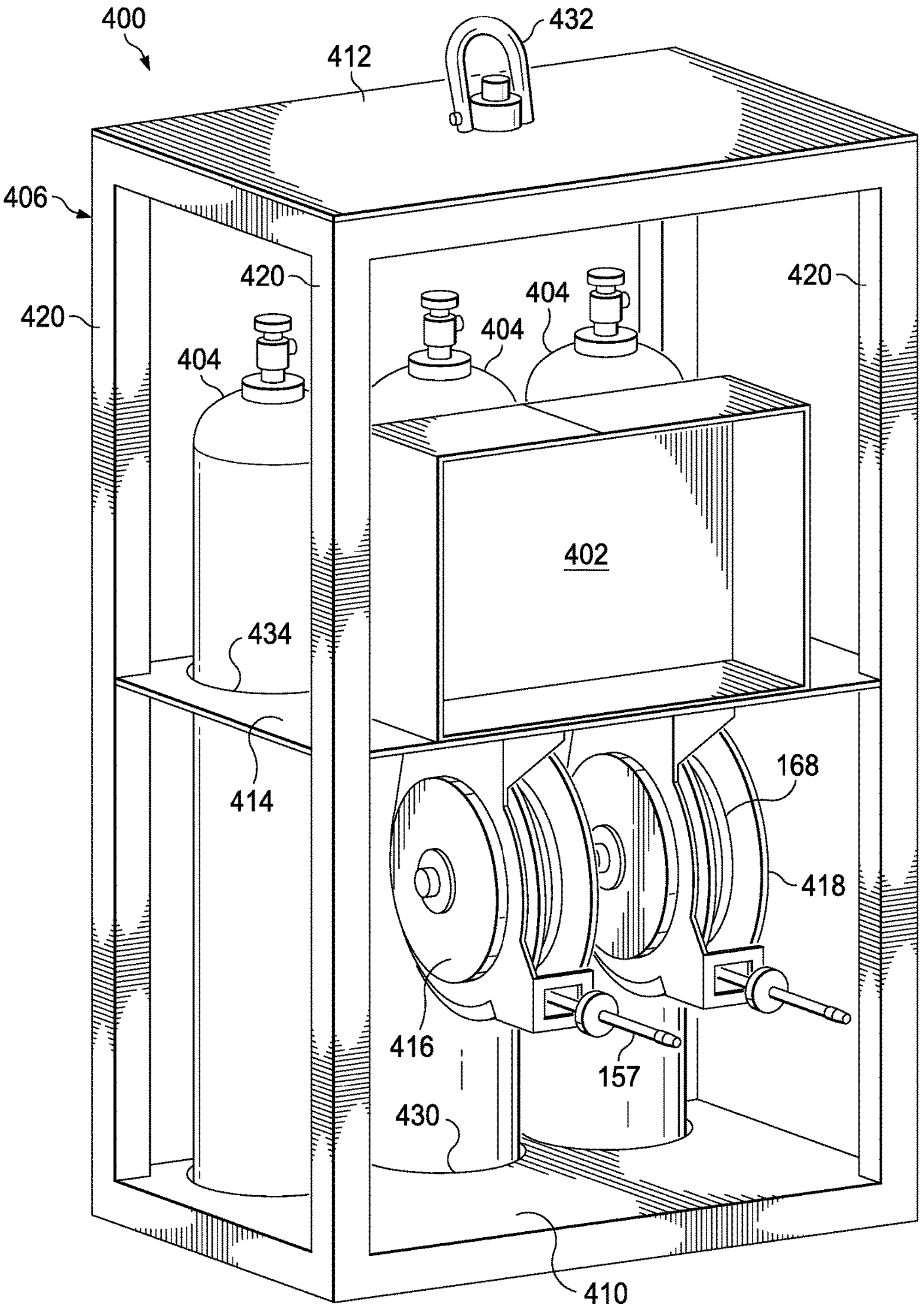
FIG. 9 is an illustration of a perspective view of an exemplary regulator unit of a relief valve system according to an exemplary aspect of the present disclosure.

FIG. 9 illustrates an alternative regulator unit 400 that may be used to communicate with the control box 154 and operate the pressure release valve 152. In some aspects, the regulator unit 400 may be used to replace the regulator unit 155 shown in FIG. 2.

In this embodiment, the regulator unit 400 includes a valve actuation system 402, an actuation fluid source 404, and a regulator structure 406 that supports the valve actuation system 402 and the actuation fluid source 404.

The actuation fluid source 404 may be the same as the actuation fluid source 170 described above. Accordingly, in some embodiments, the actuation fluid source 404 is one or more fluid tanks, such as nitrogen gas tanks, that may be used to supply actuation fluid to the valve actuation system 402. As can be seen in FIG. 9, the actuation fluid source 404 may include a plurality of gas tanks that together cooperate to form the actuation fluid source 404. Accordingly, the description of the actuation fluid source 170 applies equally to the actuation fluid source 404.

The valve actuation system 402 is formed of the main box 181 of the valve actuation system 156 described herein, and may include the same regulating components and elements described and shown with reference to the valve actuation system 156. Accordingly, the description of the above of the main box 181 and the operation and function of the components applies equally to the valve actuation system 402.

The regulator structure 406 joins the valve actuation system 402 and the fluid source 404 into a single transportable unit providing ease of transportation, simple organization, and convenience to frac operators. This all contributes to a more organized frac site and greater protection for the valve actuation system 402 and the actuation fluid source 404.

In the embodiment disclosed, the regulator structure 406 is a skid that may be lifted, carried, and moved to a desired position in the frac site 100. It may be lifted to or removed from a transportation vehicle using a forklift or crane for example, although other methods may be used. In some embodiments, it may be maintained and/or operated while disposed on a truck or other vehicle parked at the frac site 100.

The regulator structure 406 in this exemplary embodiment includes a lower platform or base 410, a top structure 412, an intermediate support structure 414, a hose reel 416, and a data cable reel 418. Struts or beams 420 connect the base 410, the top structure 412, and the support structure 414 and provide rigidity to the regulator structure 406.

In the exemplary embodiment shown, the base 410 is arranged to support or stabilize the actuation fluid source 404. In this example, in order to render the regulator structure 406 fully transportable, the base 410 includes stabilizing features 430 formed to receive the actuation fluid source 404 and that maintain the actuation fluid source 404 within the regulator structure 406. In this embodiment, where the actuation fluid source 404 is one or more nitrogen gas tanks, the stabilizing features 430 are recesses or cutouts formed in a portion of the base 410 that receive the ends of the gas tanks. Accordingly, even during transportation, the fluid actuation source 404 may be easily maintained in a relatively secure condition.

The top structure 412 in this embodiment is a roof portion that may cover at least a portion of the valve actuation system 402 and the actuation fluid source 404. In the embodiment shown, the top structure 412 is a flat plate and includes a connector portion 432 configured to aid in transportation of the regulator unit 400. In the example shown, the connector portion 432 is a ring arranged to receive a hook (not shown), such as a crane hook enabling the regulator structure 406 (and the entire regulator unit 400) to be connected moved about the frac site or onto or off of a transportation vehicle. Alternative connector portions include chains, hooks, cut-outs, hangers, or other connectors.

The support structure 414 in this embodiment connects to the struts 420 and may serve as a shelf that may be used for the placement of tools and equipment when servicing the valve actuation system 402 and the actuation fluid source 404. In addition, the support structure 414 includes fluid-source stabilizing features 434, shown in FIG. 9 as cut-outs that receive the tanks forming the actuation fluid source 404. The embodiment shown includes three independent stabilizing features 434 that support three separate fluid tanks. Accordingly even during transportation, the tanks forming the actuating fluid source 404 are separated and maintained in an upright position. In this embodiment, there are three tanks; however, other embodiments have one, two, or more than three tanks as an actuation fluid source 404.

In the embodiment shown, the valve actuation system 402 is disposed on the support structure 414. Accordingly, the components of the valve actuation system 402 are disposed at a height providing convenient access to a frac operator. As such, the frac operator has easy access to, for example, the input pressure regulator 204, the electronic pressure controller 206, the main line reducing valve 208, the first and second pressure transmitters 210, 212, and other components forming a part of the valve actuation system 402.

In the exemplary embodiment shown, the hose reel 416 is suspended from the intermediate support structure 414 and winds the hose 157 used to place the actuation fluid source 404 in fluid communication with the relief valve 152 (FIG. 2). In some embodiments, the hose reel 416 is a spring loaded reel that allows a user to unroll the hose 157 by pulling on an end, and may automatically retract and roll the hose 157 onto the regulator structure 406. This may provide convenience and efficiency to the operator.

In the exemplary embodiment shown, the data cable reel 418 is disposed adjacent the hose reel 416 and also suspended from the intermediate support structure 414. The data cable reel 418 carries the data cable 168 that extends between and connects in electrical communication the valve actuation system 402 and the control box 154. The data cable 168 may be unrolled by pulling on a cable end and connecting it to the control box 154, either directly or indirectly. In some embodiments where the control box 154 is disposed in the data van 118, the data cable 168 may extend to a connector on the data van 118 and may connect through the connector on the data van 118. Like the hose reel 416, the data cable reel 418 may be spring loaded to automatically roll the data cable 168 when desired. When wireless systems are used, naturally the data cable 168 and the data cable reel 418 may be replaced with a transmitter and receiver.

In some embodiments, both the hose 157 and the data cable 168 include quick-disconnect connectors that simply and quickly connect and disconnect to the pressure relief valve 152 and the control box 154, respectively. Other embodiments include twist connectors, snap-on connectors and other connectors including the connectors discussed with reference to the valve actuation system 156 discussed previously.

The hose reel 416 and the data cable reel 418 simplify setup and site takedown and may help reduce hose or cable clutter about the frac site. A frac site may include any number of cables and hoses extending between and connecting the data van 118 to other trucks, trailers, or equipment pieces disposed about the frac site. Accordingly, a large number of hoses and cables may lie all about the frac site. By rolling excess hose and cable lengths onto the hose and data cable reels 416, 418, the frac site may be maintained in a more organized condition.

While only one support structure 414 is shown in FIG. 9, other embodiments have multiple support structures that may be used as shelves, storage boxes, or for other utility purposes. In one embodiment, a second support structure 414 is disposed below the hose reel 416 and the data cable reel 418.

Some embodiments of the regulator structure 406 include fork-receiving structures at the base 410 that receive forks of a fork lift. In some of these embodiments, the fork-receiving structures are enclosed in order to reduce the likelihood of the regulator structure 406 tipping off the forks during transportation to or from an operating location at the frac site.

In some embodiments the regulator structure 406 is enclosed by walls that more completely protect the valve actuation system 402 and the actuation fluid source 404 from the outside environment, including, among other things, harsh or damaging weather, dust, and direct sunlight. In some embodiments, the walls are formed by solid metal material, while in other embodiments, the walls are formed of a metal mesh. Yet other embodiments have walls formed of flexible material, such as canvas material or tarpaulin. Any suitable material may be used. In some embodiments, only a portion of the regulator structure 406 is enclosed, while other parts are open to the environment.

Although shown in FIG. 9 as carrying only the valve actuation system 402 and the actuation fluid source 406, some embodiments of the regulator structure 406 also carry components of the control box 154. For example, in some embodiment, the controller 162 (FIG. 2) is disposed on the regulator structure 406, while the user interface 160 is disposed apart from the controller, such as on the data van 118. In one embodiment, the user interface 160 may be disposed in the data van 118 providing an operator with access to, for example, the display and input system, the speaker, the power switch, the emergency stop switch, and the strobe or alarm light. The data cable 168 on the regulator structure 406 and on the data cable reel 418 may then extend from the controller 162 on the regulator structure 406 to the user interface 160. In yet other embodiments, the controller 162 and user interface 160 are separate from each other, while neither is carried on the regulator structure 406. For example, the controller 162 may be disposed in a control box outside the data van 118, the user interface 160 may be disposed inside the data van 118, and the data cable may extend between the controller and the regulator structure 406. An additional data cable may extend between the user interface 160 and the controller 162.

In one embodiment, the controller 162 is configured in a manner to detect when the relief valve 152 is not operational, such as during the frac site setup. In this condition, the controller 162 may disable the alarm function to reduce the likelihood of false alarms. The alarm system may then become operational only after the relief valve system 150 is properly setup and powered. In some aspects, the controller 162 detects the lack of a pressure signal or a pressure transducer signal to disable the alarm during setup. In this embodiment, powering the system or otherwise turning on or making the alarm operational is a part of a setup procedure for the relief valve system.

Figure 10:
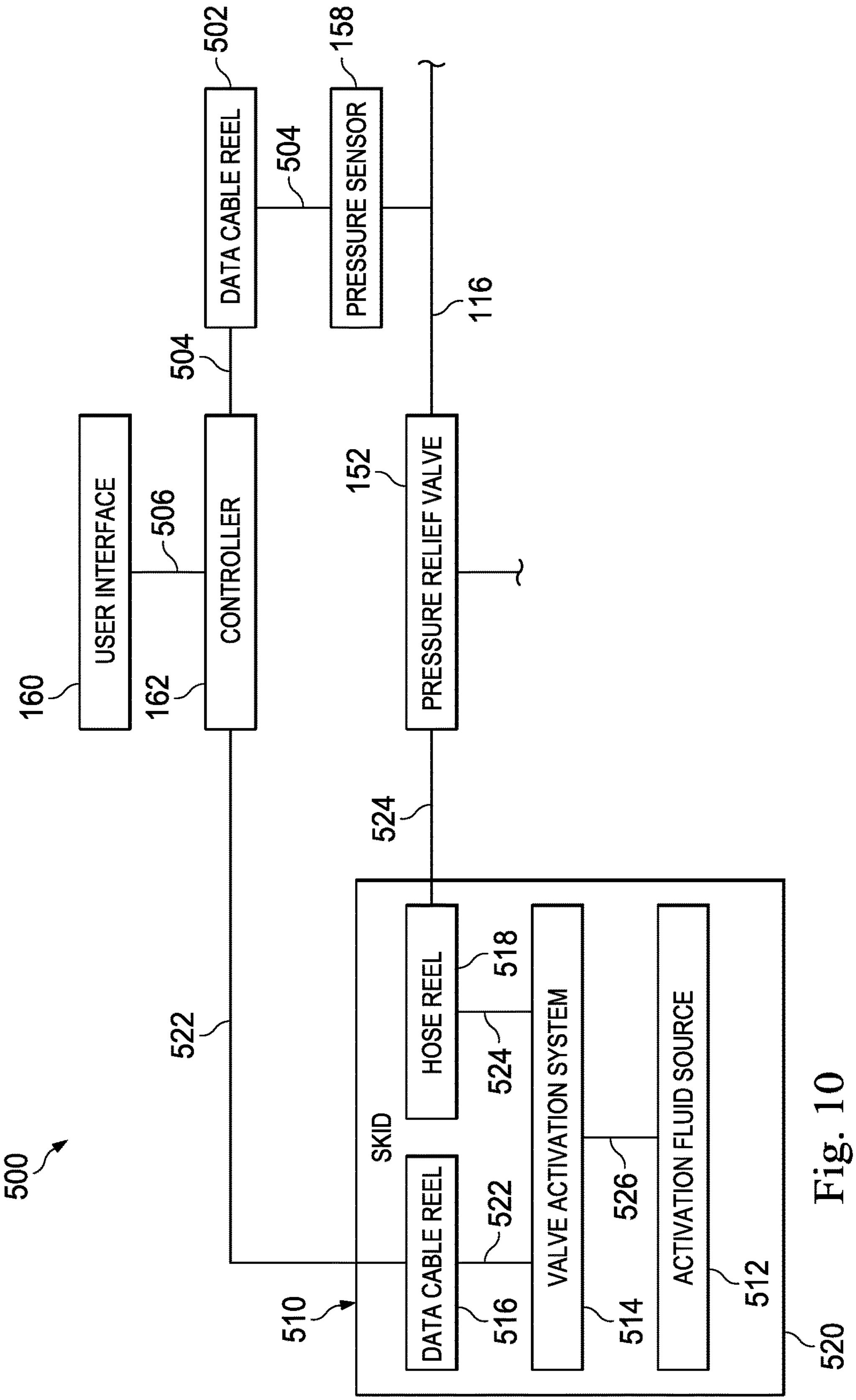
FIG. 10 is a block diagram of a relief valve system according to an exemplary embodiment, the relief valve system including a regulator unit, a user interface, and a controller.

In an exemplary embodiment, as illustrated in FIG. 10 with continuing reference to FIGS. 1-9, a relief valve system is generally referred to by the reference numeral 500 and includes several components of the relief valve system 150, which components are given the same reference numerals. In the relief valve system 500 illustrated in FIG. 10, a data cable reel 502 is located between the pressure sensor 158 and the controller 162. The data cable reel 502 carries a data cable 504, which extends between and connects in electrical communication the pressure sensor 158 and the controller 162. The user interface 160 is in electrical communication with the controller 162 via a cable assembly 506. In an exemplary embodiment, the user interface 160 and the controller 162 may be positioned in the data van 118 (shown in FIG. 1).

A regulator unit 510 is operably coupled to each of the pressure relief valve 152 and the controller 162. More particularly, the regulator unit 510 includes an actuation fluid source 512, a valve actuation system 514, a data cable reel 516, and a hose reel 518, all of which are mounted on a skid 520. The data cable reel 516 carries a data cable 522, which extends between and connects in electrical communication the valve actuation system 514 and the controller 162. The hose reel 518 carries a hose 524, which extends between and connects in fluid communication the valve actuation system 514 and the pressure relief valve 152. The valve actuation system 514 is in fluid communication with the actuation fluid source 512 via a hose 526, which is connected to the gas inlet portion 184. As will be described in further detail below, the data cable reel 502 is adapted to be removably mounted on the skid 520. In an exemplary embodiment, the regulator unit 510 may be used to replace the regulator unit 155 shown in FIG. 2. In an exemplary embodiment, the regulator unit 510 may be used to replace the regulator unit 400 shown in FIG. 9.

Figure 11:
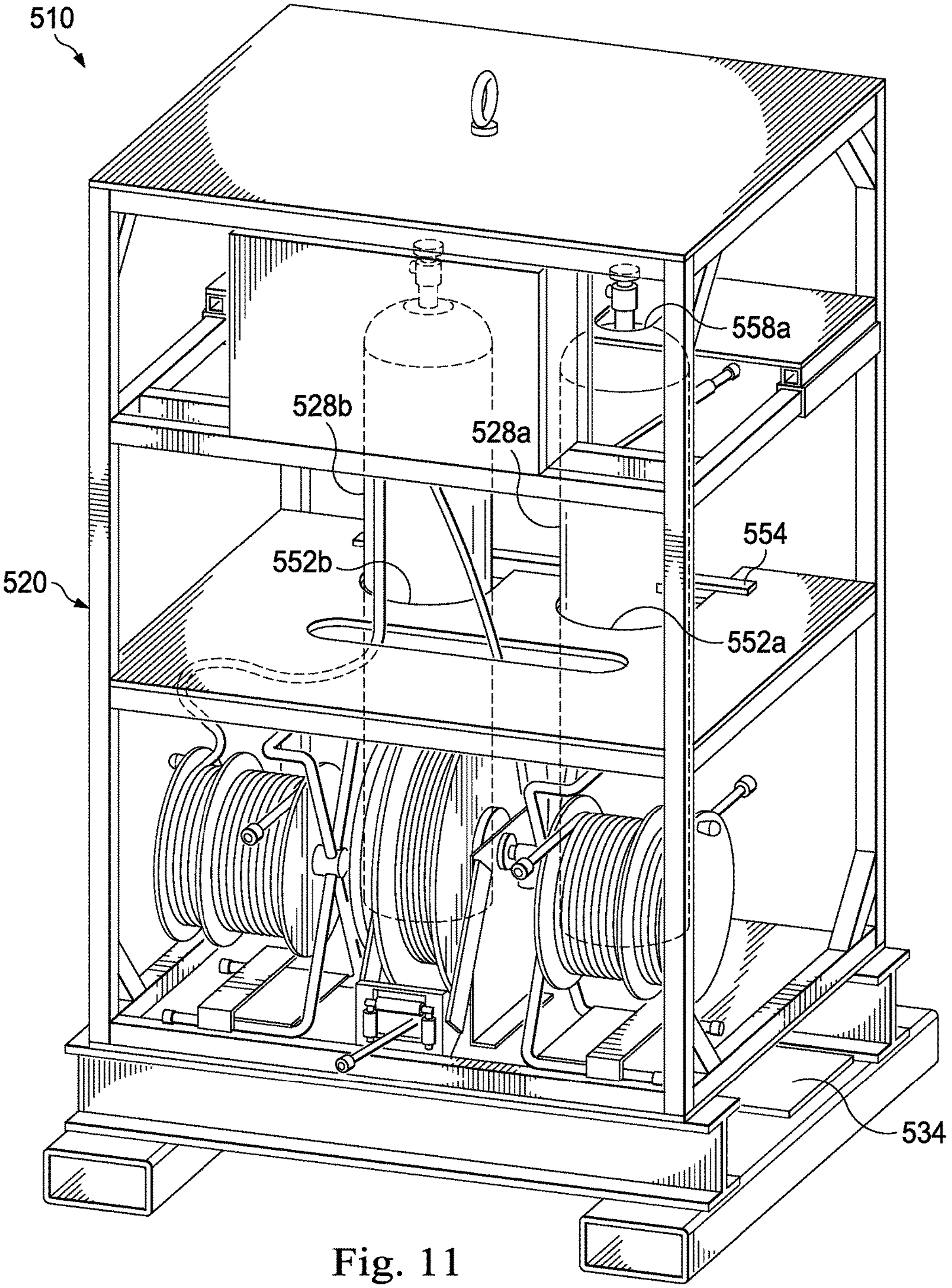
FIG. 11 is a perspective view of the regulator unit of FIG. 10 according to an exemplary embodiment, the regulator unit including an actuation fluid source.

In an exemplary embodiment, as illustrated in FIG. 11 with continuing reference to FIGS. 1-10, the actuation fluid source 512 includes a gas source, such as nitrogen tanks 528*a* and 528*b*, which are mounted on the skid 520. The actuation fluid source 512 may include one or a plurality of gas tanks, which cooperate to form the actuation fluid source 512. In an exemplary embodiment, the actuation fluid source 512 is the same as the actuation fluid source 170 described above. Accordingly, the description of the actuation fluid source 170 applies equally to the actuation fluid source 512.

Figure 12:
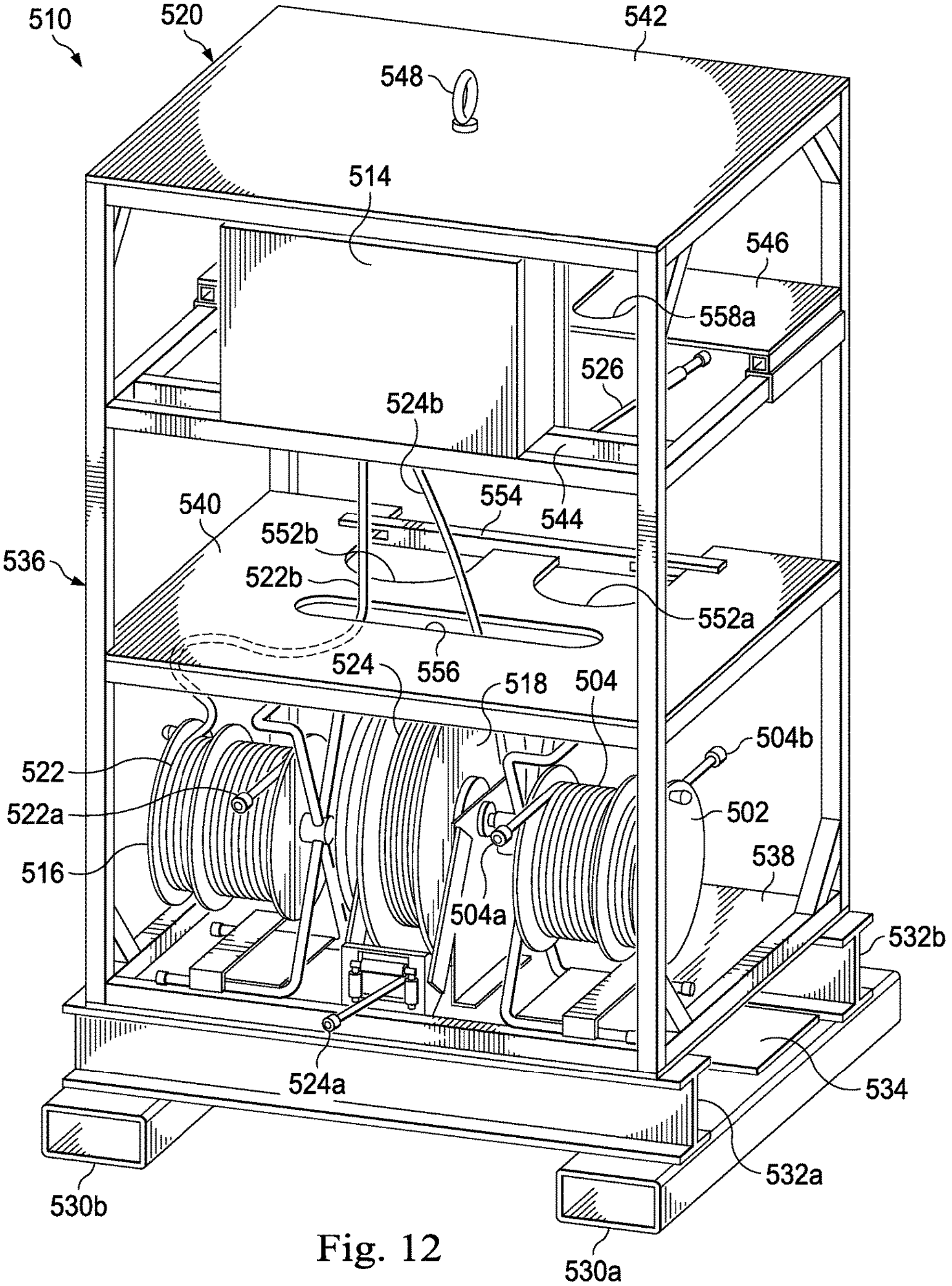
FIG. 12 is another perspective view of the regulator unit of FIG. 11, but with the actuation fluid source omitted.
Figure 13:
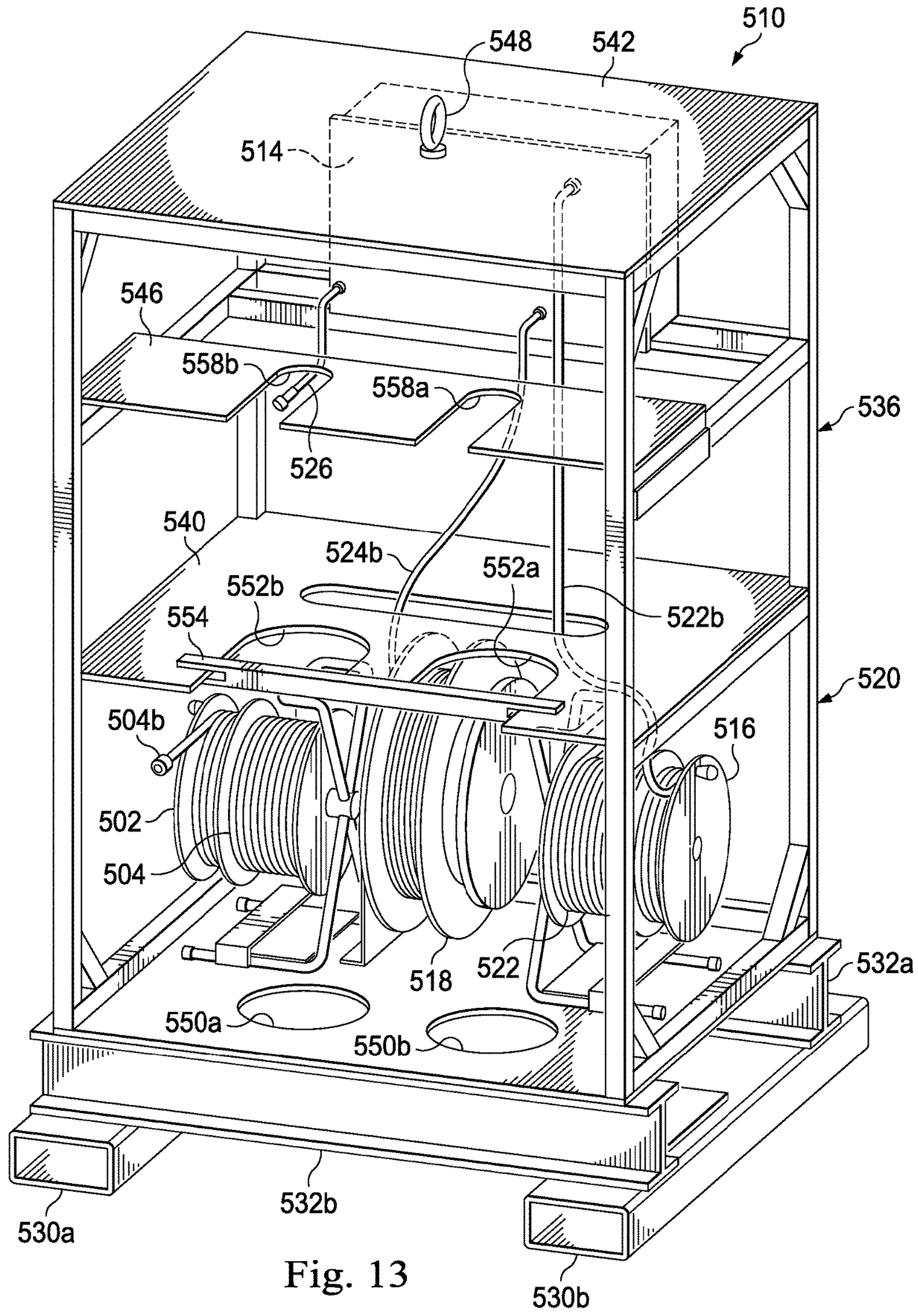
FIG. 13 is yet another perspective view of the regulator of FIG. 11, but with the actuation fluid source omitted.

FIG. 12 is the same as FIG. 11, but the nitrogen tanks 528*a* and 528*b* are omitted from FIG. 12 for the purpose of clarity. FIG. 13 is another perspective view of the regulator unit 510, and the nitrogen tanks 528*a* and 528*b* are also omitted from FIG. 13. In an exemplary embodiment, as illustrated in FIGS. 12 and 13 with continuing reference to FIGS. 1-11, the skid 520 includes parallel-spaced base members 530*a* and 530*b*, which are adapted to rest on the ground or another generally horizontal surface. Parallel-spaced beams 532*a* and 532*b* extend transversely between the base members 530*a* and 530*b* at opposing end portions thereof, respectively. A base plate 534 extends transversely between the base members 530*a* and 530*b*, and is positioned between the beams 532*a* and 532*b*. A frame 536 is mounted on top of, and extends over, the beams 532*a* and 532*b*. The frame 536 includes a lower platform 538, a middle platform 540 vertically spaced from the lower platform 538, and an upper platform 542 vertically spaced from the middle platform 540. The frame 536 further includes a support 544 and a plate 546, each of which is vertically positioned between the middle platform 540 and the upper platform 542. A lift-eye 548 is connected to the upper platform 542.

Openings 550*a* and 550*b* (FIG. 13) are formed through the lower platform 538. U-shaped notches 552*a* and 552*b* are formed in the middle platform 540. A brace 554 extends along an edge portion of, and is connected to, the middle platform 540, thereby closing off the U-shaped notches 552*a* and 552*b*. A slot 556 is formed through middle platform 540 and is generally parallel to the brace 554. The U-shaped notches 552*a* and 552*b* are positioned between the brace 554 and the slot 556. U-shaped notches 558*a* and 558*b* are formed through the plate 546.

The valve actuation system 514 is mounted on the support 544, and is positioned vertically between the support 544 and the upper platform 542. The valve actuation system 514 is formed of the main box 181 of the valve actuation system 156 described herein, and includes the same regulating components and elements described and shown with reference to the valve actuation system 156 (the legs 182 are omitted from the valve actuation system 514). Accordingly, the above description of the main box 181 and the operation and function of the components therein applies equally to the valve actuation system 514.

The hose reel 518 is mounted on the lower platform 538, proximate the beam 532*a* and between the base members 530*a* and 530*b*. At least a portion of the hose 524 is wound around the hose reel 518. In an exemplary embodiment, the hose reel 518 is a spring-loaded reel that allows a user to unroll the hose 524 by pulling on an end portion 524*a*, and may automatically retract the hose 524. The end portion 524*a* of the hose 524 is adapted to be connected, either directly or indirectly, to the pressure relief valve 152. Another end portion 524*b* of the hose 524 extends from the hose reel 518, upward through the slot 556, and to the valve actuation system 514; the end portion 524*b* is connected to the gas outlet portion 186 of the valve actuation system 514.

The data cable reel 516 is mounted on the lower platform 538, proximate the beam 532*a* and the base member 530*b*. At least a portion of the data cable reel 516 is positioned between the base member 530*b* and the hose reel 518. At least a portion of the data cable 522 is wound around the data cable reel 516. An end portion 522*a* of the data cable 522 is adapted to be connected to the controller 162. Another end portion 522*b* of the data cable 522 extends from the data cable reel 516, upward through the slot 556, and to the valve actuation system 514, to which the end portion 522*b* is connected.

As shown in FIGS. 11, 12, and 13, the data cable reel 502 may be removably mounted on the lower platform 538, proximate the beam 532*a* and the base member 530*a*, so that the hose reel 518 is positioned between the data cable reels 516 and 502. At least a portion of the data cable 504 is wound around the data cable reel 502. An end portion 504*a* is adapted to be connected to the pressure sensor 158. Another end portion 504*b* of the data cable 504 extends from the data cable reel 502 and to the controller 162, to which the end portion 504*b* is connected. In several exemplary embodiments, and as described below, the data cable reel 502 may be removed from the skid 520, and thus no longer mounted on the lower platform 538, during the installation of the regulator unit 510, as required and/or desired by installation personnel.

In an exemplary embodiment, when the regulator unit 510 is in the assembled condition shown in FIG. 11, a top portion of the nitrogen tank 528*a* extends through the notch 558*a*, a middle portion of the nitrogen tank 528*a* extends through the notch 552*a*, and the bottom portion of the nitrogen tank 528*a* extends through the opening 550*a* and rests on the base plate 534. Similarly, a top portion of the nitrogen tank 528*b* extends through the notch 558*b*, a middle portion of the nitrogen tank 528*b* extends through the notch 552*b*, and the bottom portion of the nitrogen tank 528*b* extends through the opening 550*b* and rests on the base plate 534. By closing off the notches 552*a* and 552*b*, the brace 554 maintains the respective positions of the nitrogen tanks 528*a* and 528*b* on the skid 520.

Figure 14:
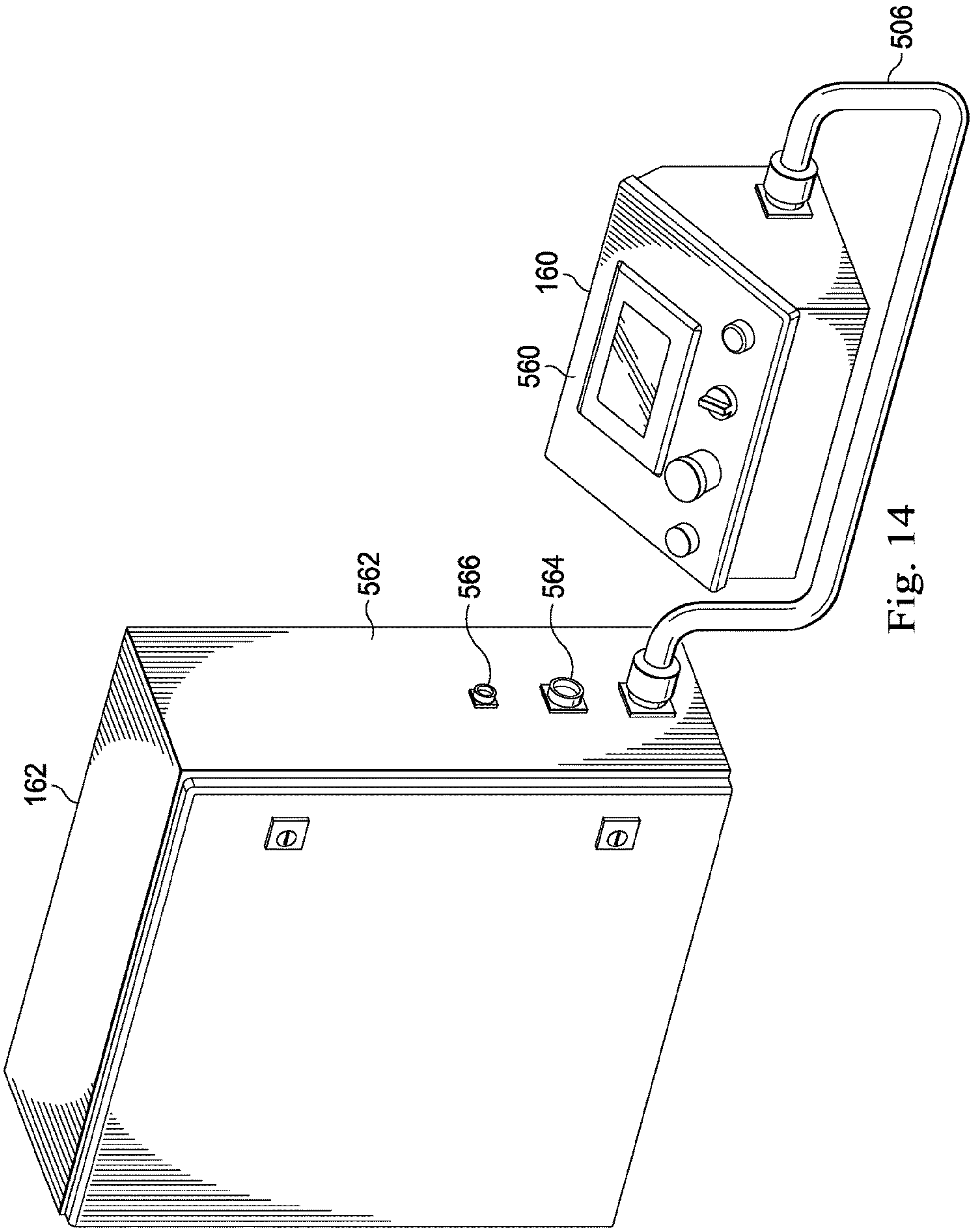
FIG. 14 is a perspective view of the user interface and controller of FIG. 10 according to an exemplary embodiment.

In an exemplary embodiment, as illustrated in FIG. 14 with continuing reference to FIGS. 1-13, the user interface 160 and the controller 162 include enclosures 560 and 562, respectively. The cable assembly 506 extends between, and is connected to, the enclosures 560 and 562. The controller 162 further includes connectors 564 and 566. The end portion 522*a* of the data cable 522 is adapted to be connected to the connector 564. The end portion 504*b* of the data cable 504 is adapted to be connected to the connector 566. As shown in FIG. 14, the user interface 160 and the controller 162 are not disposed in the control box 154 (shown in FIG. 1). In several exemplary embodiments, the user interface 160 and the controller 162 are non-intrinsically safe, and are located in the data van 118 (shown in FIG. 1).

In several exemplary embodiments, with continuing reference to FIGS. 1-14, to set up or otherwise install the regulator unit 510 at a frac site, such as the frac site 100, the regulator unit 510 is placed in the assembled condition shown in FIG. 11, and the data cable reel 502 is removably mounted to the skid 520, as shown in FIGS. 11, 12 and 13. As a result, the regulator unit 510 is a single transportable unit, which is moved to a desired location at the frac site 100. In several exemplary embodiments, the base members 530*a* and 530*b* may receive forks of a fork lift, and the fork lift may be used to move the regulator unit 510 to the desired location at the frac site 100. In several exemplary embodiments, a crane may engage the lift eye 548, and the crane may be used to lift and move the regulator unit 510 to the desired location at the frac site 100. In several exemplary embodiments, the regulator unit 510 may be positioned on, and/or moved by, a truck or other vehicle.

In an exemplary embodiment, after the regulator unit 510 has been moved to the desired location at the frac site 100, the data cable reel 502 is removed from the skid 520 of the regulator unit 510. The data cable reel 502 is then positioned at a desired location at the frac site 100. Before, during or after the positioning of the data cable reel 502, the end portion 504*a* of the cable 504 is connected to the pressure sensor 158, and the end portion 504*b* of the cable 504 is connected to the connector 566 of the controller 162. Before, during or after these connections with the cable 504, the end portion 524*a* of the hose 524 is connected to the pressure relief valve 152, and the end portion 522*a* is connected to connector 564 of the controller 162. As noted above, the user interface 160 and the controller 162 are positioned in the data van 118.

In several exemplary embodiments, the operation of the relief valve system 500 using the regulator unit 510 is substantially identical to the operation of the relief valve system 150 using the relief valve system 150. Therefore, the operation of the relief valve system 500 will not be described in further detail.

In several exemplary embodiments, an exemplary method of using the relief valve system 500 as a part of the fracing equipment at the frac site 100 is substantially identical to the method 300 illustrated in FIG. 8. At the step 304, all lines and cables are connected in the relief valve system 500 in accordance with the above description of the relief valve system 500 and the illustrations thereof in FIGS. 10-14. The above description of the method 300 of FIG. 8 using the relief valve system 150 is substantially identical to a description of an exemplary method of using the relief valve system 500, except that all references to the relief valve system 150, the actuation fluid source 170, and the valve actuation system 156 are replaced with references to the relief valve system 500, the actuation fluid source 512, and the valve actuation system 514, respectively.

Figure 15A:
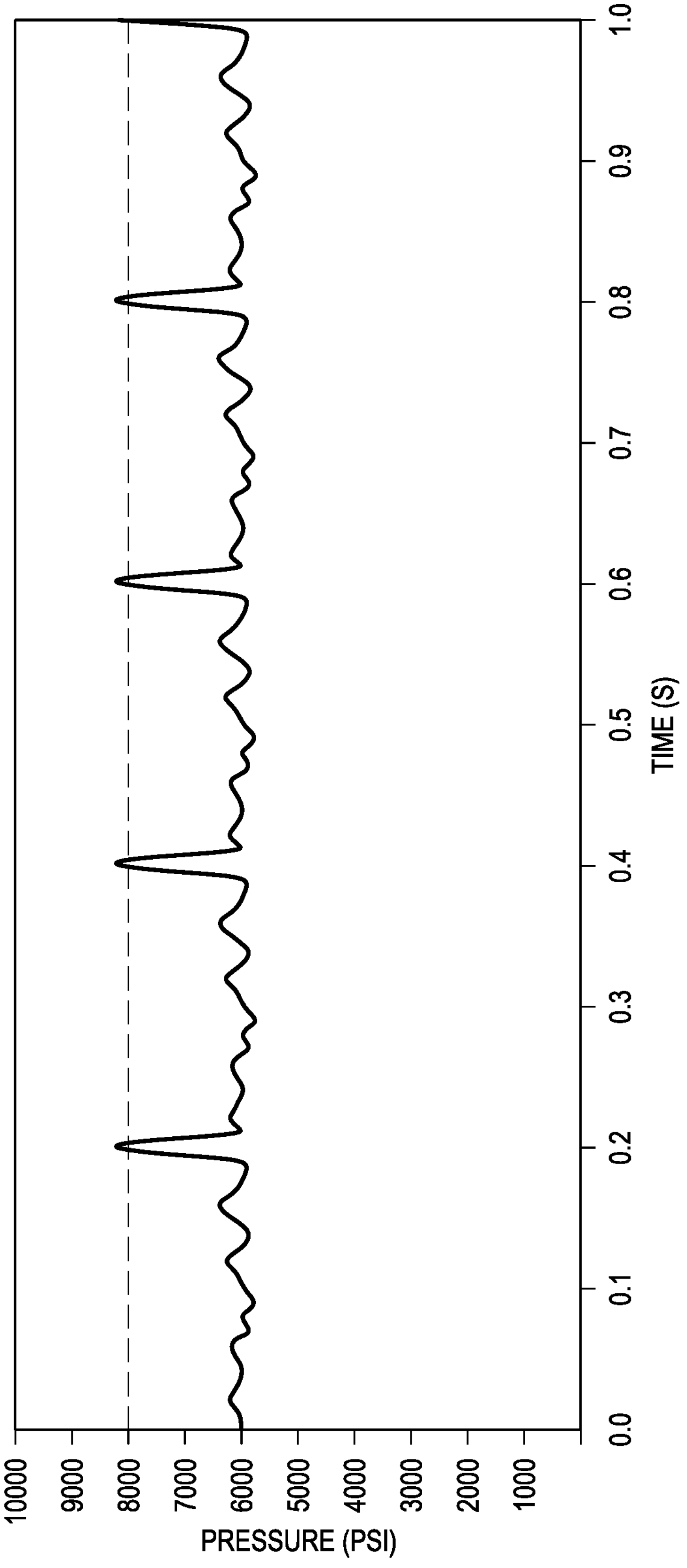
FIG. 15A is a graph depicting pressure versus time during a step of the method of FIG. 8, according to an exemplary embodiment.
Figure 15B:
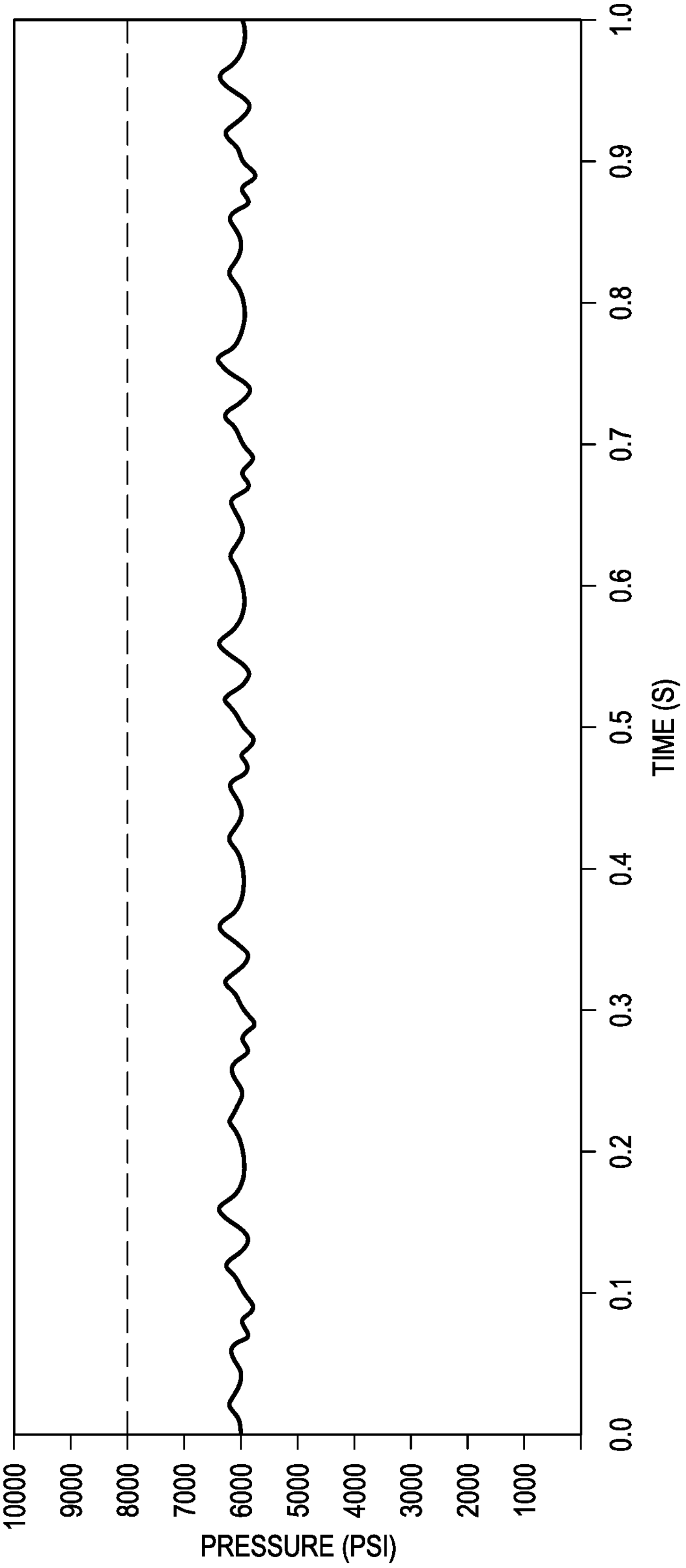
FIG. 15B is a graph similar to that of FIG. 15A but with pressure spikes omitted, according to an exemplary embodiment.

In an exemplary embodiment, as illustrated in FIGS. 15A and 15B with continuing reference to FIGS. 1-14, example values of frac fluid pressure in the high pressure tubing 116 are plotted over time. In several exemplary embodiments, these example values may be measured by the pressure sensor 158 during the step 314 of the method 300 illustrated in FIG. 8. As shown in FIG. 15A, an example stored pressure threshold or popoff pressure is about 8,000 psi, and the great majority of the example pressure values are around 6,000 psi. However, example pressure spikes above the example popoff pressure of 8,000 psi may also be measured by the pressure sensor 158. FIG. 15A illustrates an example quantity of five (5) pressure spikes above the example popoff pressure of about 8,000 psi. These example pressure spikes may be due to, for example, temporary pressure pulsations, pressure spikes, signal noise, etc., but may not expose the fracing system to failure loading. Accordingly, as shown in FIG. 15B, as described above in connection with the controller 162 and the step 314 of the method 300, the data transmission or signal from the pressure sensor 58 may be dampened by determining whether an example nominal pressure of the frac fluid in the high pressure tubing 116 is over the example stored pressure threshold or popoff pressure. FIG. 15B illustrates an example nominal pressure of about 6,000 psi. Since the example nominal pressure of about 6,000 psi is less than the example popoff pressure of about 8,000 psi, the pressure relief valve 152 does not open the pressure relief valve 152. This provides many advantages over a system that does not use electronic control of its pressure relief valve because it may reduce the occurrence of valve chatter as the valve responds to pressure spikes. This in turn may increase reliability, reduce wear, and increase the overall robustness of the system.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

We claim:

1. A pressure relief valve system, comprising:

a pressure relief valve having a closed state and an open state, wherein the pressure relief valve is configured to relieve pressure from high pressure tubing extending between a pump and a wellhead, and wherein the pressure relief valve is configured to be maintained in the closed state with a pressurized gas from a gas source;

a sensor configured to detect pressure in the high pressure tubing;

a controller programmable to have a stored pressure threshold, the controller being configured to receive data from the sensor and compare the pressure in the high pressure tubing to the stored pressure threshold;

one or more flow pipes, the one or more flow pipes comprising an input portion configured to be connected to the gas source, and an output portion configured to be connected to the pressure relief valve;

a reducing valve configured to be disposed between the input portion and the output portion, and to adjust the pressure in the output portion based on data from the controller; and a dump valve configured to open so that the state of the pressure relief valve changes from the closed state to the open state.

2. The pressure relief valve system of claim 1, wherein the controller is configured to emit a command signal, to change the state of the pressure relief valve from the closed state to the open state, when the controller determines that the pressure in the high pressure tubing exceeds the stored pressure threshold.

3. The pressure relief valve system of claim 1, further comprising a second controller configured to determine a suitable pressure for the output portion, and to adjust the reducing valve to achieve the suitable pressure in the output portion.

4. The pressure relief valve system of claim 3, wherein the suitable pressure is about 105-150% of a gas pressure threshold that opens the relief valve.

5. The pressure relief valve system of claim 1, further comprising a first pressure transmitter configured to detect pressure of the output portion and a second pressure transmitter configured to detect pressure of the input portion.

6. The pressure relief valve system of claim 1, wherein the controller is configured to emit a command signal, to change the state of the pressure relief valve from the closed state to the open state, when the controller determines that a nominal pressure in the high pressure tubing over a predetermined increment of time exceeds the stored pressure threshold.

7. The pressure relief valve system of claim 6, wherein the controller is configured to determine that the nominal pressure in the high pressure tubing over the predetermined increment of time exceeds the stored pressure threshold by averaging the pressure in the high pressure tubing over the predetermined increment of time and comparing the average pressure to the stored pressure threshold.

8. The pressure relief valve system of claim 6, wherein the controller is configured to determine that the nominal pressure in the high pressure tubing over the predetermined increment of time exceeds the stored pressure threshold by detecting that the pressure in the high pressure tubing exceeds the stored pressure threshold, starting an internal timer that runs for the predetermined increment of time, and detecting that the pressure in the high pressure tubing continues to exceed the stored pressure threshold at the conclusion of the predetermined increment of time.

9. The pressure relief valve system of claim 1, wherein the controller comprises a processor and a memory in which the pressure threshold is stored.

10. A pressure relief valve system, comprising:

a pressure relief valve configured to relieve pressure from high pressure tubing extending between a pump and a wellhead;

a sensor configured to detect pressure in the high pressure tubing; and a controller comprising a processor and a memory in which a pressure threshold is stored, the processor being configured to receive data from the sensor and compare the detected pressure to the stored pressure threshold;

wherein the pressure relief valve is configured to change from a closed state to an open state in response to an emission of a command signal from the controller; and wherein the controller is configured to emit the command signal when the controller determines at least one of the following:

that the detected pressure exceeds the stored pressure threshold; and that a nominal pressure in the high pressure tubing over a predetermined increment of time exceeds the stored pressure threshold.

11. The pressure relief valve system of claim 10, wherein the controller is configured to emit the command signal when the controller determines that the nominal pressure in the high pressure tubing over the predetermined increment of time exceeds the stored pressure threshold; and wherein the controller is configured to determine that the nominal pressure in the high pressure tubing over the predetermined increment of time exceeds the stored pressure threshold by averaging the pressure in the high pressure tubing over the predetermined increment of time and comparing the average pressure to the stored pressure threshold.

12. The pressure relief valve system of claim 10, further comprising a dump valve configured to receive the command signal from the controller.

13. The pressure relief valve system of claim 10, further comprising:

one or more flow pipes, the one or more flow pipes comprising an input portion configured to be connected to a gas source, and an output portion configured to be connected to the pressure relief valve; and a reducing valve configured to be disposed between the input portion and the output portion, and to adjust the pressure in the output portion based on data from the controller.

14. The pressure relief valve system of claim 13, further comprising a first pressure transmitter configured to detect pressure of the output portion, and a second pressure transmitter configured to detect pressure of the input portion.

15. The pressure relief valve system of claim 10, further comprising a dump valve configured to receive the command signal from the controller.

16. The pressure relief valve system of claim 15, further comprising a reducing valve configured to adjust a pressure based on data from the controller.

17. The pressure relief valve system of claim 16, further comprising one or more flow pipes, the one or more flow pipes comprising an input portion configured to be connected to a gas source, and an output portion configured to be connected to the pressure relief valve;

wherein the reducing valve is configured to be disposed between the input portion and the output portion; and wherein the pressure configured to be adjusted by the reducing valve based on the data from the controller is the pressure in the output portion.

18. The pressure relief valve system of claim 17, further comprising the gas source to which the input portion is configured to be connected.

19. A pressure relief valve system, comprising:

a pressure relief valve configured to relieve pressure from high pressure tubing extending between a pump and a wellhead;

a sensor configured to detect pressure in the high pressure tubing; and a controller programmable to have a stored pressure threshold, the controller being configured to receive data from the sensor and compare the detected pressure to the stored pressure threshold;

wherein the pressure relief valve is configured to change from a closed state to an open state in response to an emission of a command signal from the controller;

wherein the controller is configured to emit the command signal when the controller determines that the nominal pressure in the high pressure tubing over the predetermined increment of time exceeds the stored pressure threshold; and wherein the controller is configured to determine that the nominal pressure in the high pressure tubing over the predetermined increment of time exceeds the stored pressure threshold by detecting that the pressure in the high pressure tubing exceeds the stored pressure threshold, starting an internal timer that runs for the predetermined increment of time, and detecting that the pressure in the high pressure tubing continues to exceed the stored pressure threshold at the conclusion of the predetermined increment of time.

20. A pressure relief valve system, comprising:

a pressure relief valve configured to relieve pressure from high pressure tubing extending between a pump and a wellhead;

a sensor configured to detect pressure in the high pressure tubing; and a controller programmable to have a stored pressure threshold, the controller being configured to receive data from the sensor and compare the detected pressure to the stored pressure threshold;

wherein the pressure relief valve is configured to change from a closed state to an open state in response to an emission of a command signal from the controller; and wherein the controller is configured to emit the command signal when the controller determines at least one of the following:

that the detected pressure exceeds the stored pressure threshold; and that a nominal pressure in the high pressure tubing over a predetermined increment of time exceeds the stored pressure threshold;

and wherein the system further comprises:

one or more flow pipes, the one or more flow pipes comprising an input portion configured to be connected to a gas source, and an output portion configured to be connected to the pressure relief valve;

a reducing valve configured to be disposed between the input portion and the output portion, and to adjust the pressure in the output portion based on data from the controller; and another controller configured to determine a suitable pressure for the output portion, the another controller configured to adjust the reducing valve to achieve the suitable pressure in the output portion.

21. The pressure relief valve system of claim 20, wherein the suitable pressure is about 105-150% of a gas pressure threshold that opens the relief valve.

* * * * *